US006496512B1

(12) United States Patent
Medhat

(10) Patent No.: US 6,496,512 B1
(45) Date of Patent: Dec. 17, 2002

(54) SYSTEM AND METHOD FOR CONNECTING CALLS WITH A TIME DIVISION MULTIPLEX MATRIX

(75) Inventor: Khalid Mohamed Medhat, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/218,820

(22) Filed: Dec. 22, 1998

(51) Int. Cl.[7] .......................... H04L 12/28; H04L 12/56
(52) U.S. Cl. ........................................ 370/410; 370/466
(58) Field of Search ................................ 370/351–356, 370/395.1, 396, 397, 398, 399, 395.5, 401, 400, 410, 465, 466, 467

(56) References Cited

U.S. PATENT DOCUMENTS

| 5,375,124 A | * 12/1994 | D'Ambrogio et al. | ...... 370/410 |
| 6,167,119 A | * 12/2000 | Bartholomew et al. | .. 379/88.04 |
| 6,229,887 B1 | * 5/2001 | Albers et al. | ................ 379/219 |
| 6,314,103 B1 | * 11/2001 | Medhat et al. | ............... 370/395 |
| 6,345,048 B1 | * 2/2002 | Allen, Jr. et al. | ............ 370/352 |

FOREIGN PATENT DOCUMENTS

| WO | WO 98/23052 | 5/1998 |
| WO | WO 98/23065 | 5/1998 |

OTHER PUBLICATIONS

K. F. Kocan, P. A. Riley, and R. J. Zurawski, "Universal Premises Access to Voice Band and ATM Networks Using a Broadband Interworking Gateway," Bell Labs Technical Journal, Apr.–Jun. 1998, p. 93–108.

* cited by examiner

Primary Examiner—Ajit Patel
(74) Attorney, Agent, or Firm—Harley R. Ball; Steven J. Funk; Kevin D. Robb

(57) ABSTRACT

A system and method for connecting a call includes a signaling processor adapted to receive and process call signaling to select connections for a call. The signaling processor transmits control messages designating the selected connections. A controllable time division multiplex matrix receives control messages from the signaling processor and, in response to the control messages, makes connections for the call. The system and method may include an interworking unit that receives control messages from the signaling processor and, in response to the control messages, interworks the calls to selected connections. The system and method may include an asynchronous transfer mode matrix that receives control messages from the signaling processor and, in response to the control messages, connects the calls to selected connections.

20 Claims, 18 Drawing Sheets

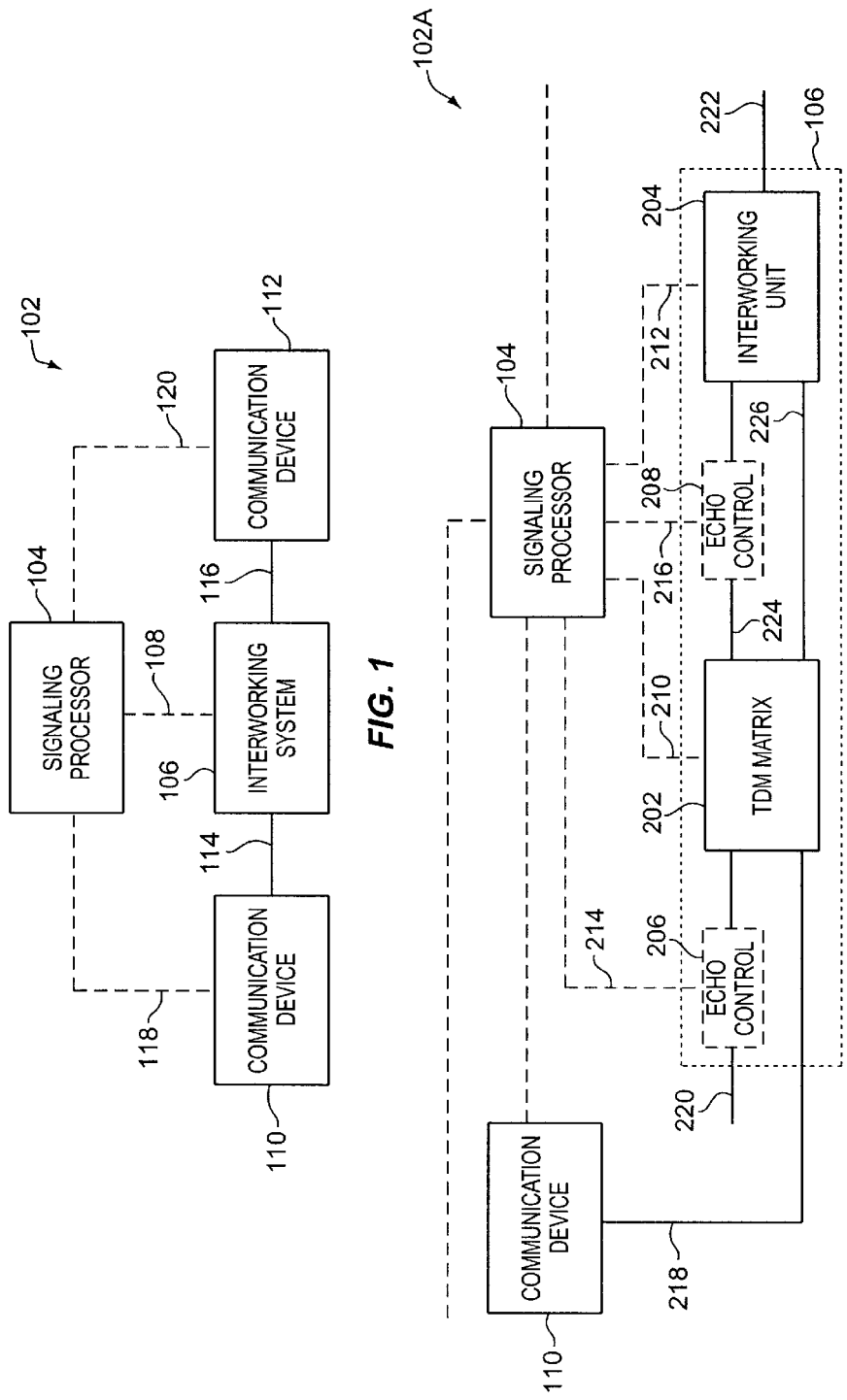

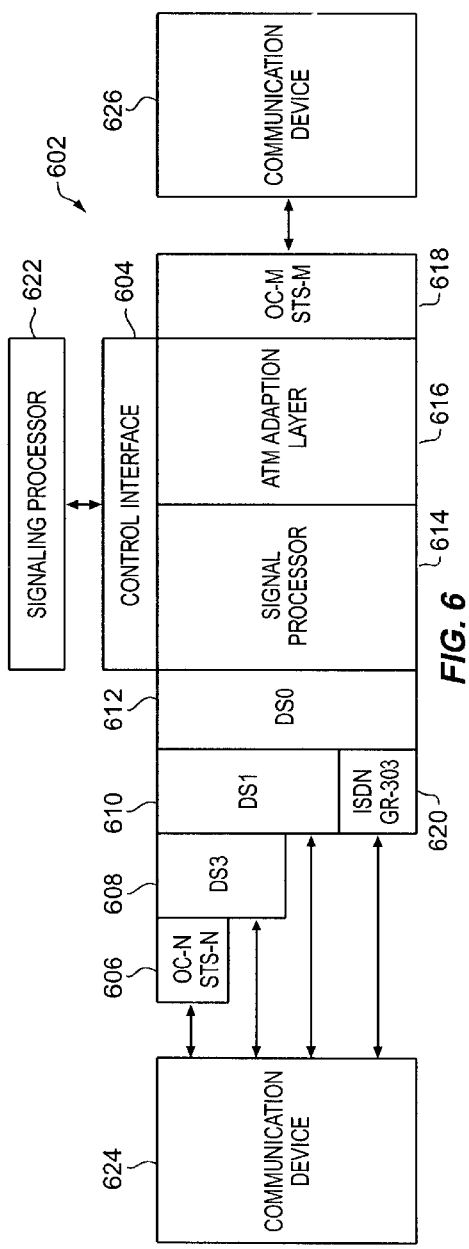
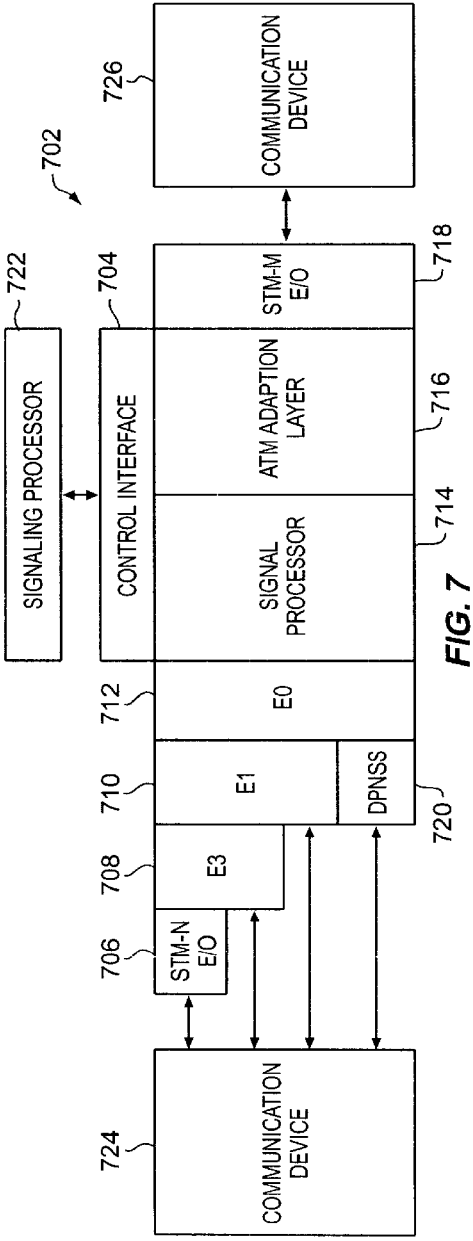

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
| | | | | | | | | |
| | | | | | | | | |

FIG. 13

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
| | | | | | | | |
| | | | | | | | |

FIG. 14

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
| | | | | | | | | |
| | | | | | | | | |

FIG. 15A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
| | | | | | | | | |
| | | | | | | | | |

FIG. 15B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
| | | | | | | | |
| | | | | | | | |

FIG. 15C

| CARRIER LABEL | CARRIER ID | CARRIER SELECTION | NEXT FUNCTION | NEXT LABEL |
|---|---|---|---|---|
| | | | | |
| | | | | |

FIG. 16

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |
| | | | | | | |

FIG. 17

| OLI LABEL | ORIGINATION LINE INFORMATION | NEXT FUNCTION | NEXT LABEL |
|---|---|---|---|
| | | | |
| | | | |

FIG. 18

| ANI LABEL | CHARGE CALLING PARTY NUMBER | | TIME ZONE LABEL | CUSTOMER INFORMATION | EC INFORMATION | QUEUE | TREATMENT LABEL | NEXT FUNCTION | NEXT LABEL |
|---|---|---|---|---|---|---|---|---|---|
| | DIGITS FROM | DIGITS TO | | | | | | | |
| | | | | | | | | | |
| | | | | | | | | | |

FIG. 19

| CALLED NUMBER SCREENING LABEL | CALLED NUMBER | | | DELETE DIGITS | NEXT FUNCTION | NEXT LABEL |
|---|---|---|---|---|---|---|
| | NATURE OF ADDRESS | DIGITS FROM | DIGITS TO | | | |
| | | | | | | |
| | | | | | | |

FIG. 20

| CALLED NUMBER LABEL | CALLED NUMBER | | NEXT FUNCTION | NEXT LABEL |
|---|---|---|---|---|
| | NATURE OF ADDRESS | DIGITS FROM | DIGITS TO | |
| | | | | |
| | | | | |

FIG. 21

| DAY OF YEAR LABEL | DATE | NEXT FUNCTION | NEXT LABEL |
|---|---|---|---|
| | | | |
| | | | |

FIG. 22

| DAY OF WEEK | DAY FROM | DAY TO | NEXT FUNCTION | NEXT LABEL |
|---|---|---|---|---|
| | | | | |
| | | | | |

FIG. 23

| TIME OF DAY LABEL | TIME FROM | TIME TO | NEXT FUNCTION | NEXT LABEL |
|---|---|---|---|---|
| | | | | |
| | | | | |

FIG. 24

| TIME ZONE LABEL | UTC OFFSET | DAYLIGHT SAVINGS |
|---|---|---|
| | | |
| | | |

FIG. 25

| ROUTING LABEL | ROUTE NUMBER | NEXT FUNCTION | NEXT LABEL | SIGNAL ROUTE LABEL |
|---|---|---|---|---|
| | | | | |

FIG. 26

| ORIGINATING TRUNK COS LABEL | TERMINATING TRUNK COS LABEL | NEXT FUNCTION | NEXT LABEL |
|---|---|---|---|
| | | | |

FIG. 27

| TREATMENT LABEL | ERROR/CAUSE LABEL | NEXT FUNCTION | NEXT LABEL |
|---|---|---|---|
| | | | |

FIG. 28

| OUTGOING RELEASE LABEL | LOCATION | OUTGOING CAUSE VALUE CODING STANDARD | CAUSE VALUE |
|---|---|---|---|
| | | | |

FIG. 29

| PERCENT LABEL | CONTROL PERCENTAGE | CONTROL NEXT FUNCTION | NEXT LABEL | PASSED NEXT FUNCTION | NEXT LABEL |
|---|---|---|---|---|---|
| | | | | | |

FIG. 30

| CALL RATE LABEL | CALL RATE | CONTROL | | PASSED |
| --- | --- | --- | --- | --- |
| | | NEXT FUNCTION | NEXT LABEL | NEXT LABEL |
| | | | | |
| | | | | |

FIG. 31

| DATABASE SERVICES LABEL | SERVICE TYPE | SCCP LABEL | TCAP LABEL | NEXT FUNCTION | NEXT LABEL |
| --- | --- | --- | --- | --- | --- |
| | | | | | |
| | | | | | |

FIG. 32

| SCCP LABEL | MESSAGE TYPE | PROTOCOL CLASS | MESSAGE HANDLING | HOP COUNTER | SEGMENTATION |
| --- | --- | --- | --- | --- | --- |
| | | | | | |
| | | | | | |

FIG. 33A

| ISNI TYPE | ISNI | | MARK INDICATOR |
| --- | --- | --- | --- |
| | ROUTE INDICATOR | LABEL | |
| | | | |
| | | | |

FIG. 33B

| SSN | CALLED PARTY ADDRESS | | | | | | | | |
| --- | --- | --- | --- | --- | --- | --- | --- | --- | --- |
| | ADDRESS INDICATOR | | | | PRINT CODE NUMBER | SUB SYSTEM NUMBER | GLOBAL TITLE | | |
| | POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| | | | | | | | | | | |

| CALLING PARTY ADDRESS | | | | | | | | | |
|---|---|---|---|---|---|---|---|---|---|
| | ADDRESS INDICATOR | | | SUB SYSTEM NUMBER | PRINT CODE NUMBER | GLOBAL TITLE | | | |
| SSN | POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| | | | | | | | | | | |
| | | | | | | | | | | |

FIG. 34

| ISNI LABEL | NETWORK 1 | NETWORK 2 | NETWORK 3 | NETWORK ... | NETWORK 16 |
|---|---|---|---|---|---|
| | | | | | |
| | | | | | |

FIG. 35

| TCAP LABEL | TCAP TYPE | TAG CLASS | PACKAGE TYPE | COMPONENT TYPE | MESSAGE TYPE |
|---|---|---|---|---|---|
| | | | | | |
| | | | | | |

FIG. 36

| ECHO CANCELLER LABEL | ECHO CANCELLER TYPE | RS-232 ADDRESS | MODULE |
|---|---|---|---|
| | | | |
| | | | |

FIG. 37

| IWU LABEL | IWU ID | IP SOCKET 1 | IP SOCKET 2 | IP SOCKET 3 | IP SOCKET 4 |
|---|---|---|---|---|---|
| | | | | | |
| | | | | | |

FIG. 38

| CAM INTERFACE LABEL | CAM LABEL | LOGICAL INTERFACE |
|---|---|---|
| | | |
| | | |

| CAM LABEL | CAM TYPE | CAM ADDRESS |
|---|---|---|
|  |  |  |
|  |  |  |

FIG. 39

| OFFICE CLLI NAME | SITE NODE ID | ORIGINATION ID | SOFTWARE ID | CALL PROCESSOR ID |
|---|---|---|---|---|
|  |  |  |  |  |
|  |  |  |  |  |

FIG. 40A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
|  |  |  |  |  |  |  |
|  |  |  |  |  |  |  |

FIG. 40B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
|  |  |  |  |  |  |  |
|  |  |  |  |  |  |  |

FIG. 40C

| MAX HOP COUNTS | MAX TABLE LOOKUPS |
|---|---|
|  |  |

FIG. 40D

| AIN EVENT PARAMETERS LABEL | MESSAGE NAME #1 | MESSAGE NAME #... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

*FIG. 41A*

| AIN EVENT PARAMETERS LABEL | MESSAGE NAME #1 | MESSAGE NAME #... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

*FIG. 41B*

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

*FIG. 42*

SYSTEM AND METHOD FOR CONNECTING CALLS WITH A TIME DIVISION MULTIPLEX MATRIX

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call switching and call connection.

BACKGROUND OF THE INVENTION

Broadband systems provide telecommunications providers with many benefits, including greater bandwidth, more efficient use of bandwidth, and the ability to integrate voice, data, and video communications. These broadband systems provide callers with increased capabilities at lower costs.

The broadband systems may include both time division multiplex (TDM) devices and asynchronous transfer mode (ATM) devices. Multiple TDM devices in a network may be used to make connections to other networks or other devices in the network.

Often, these TDM devices have a single connection or trunk for user communications to the other communication devices. However, if the connection or trunk is damaged so that calls over the connection or trunk are interrupted or dropped, or if the bandwidth on the connection or trunk becomes fully used so that calls may not be connected over the connection or trunk, then calls must be rerouted through another TDM device. Unfortunately, typically calls must be rerouted at the source of the call through other connections. Thus, a system and method are needed to provide connections through TDM systems in a more efficient manner. The preset invention fulfills this need.

SUMMARY OF THE INVENTION

The present invention is directed to a system for connecting a call having user communications and call signaling. The system comprises a controllable time division multiplex matrix that is adapted to receive the user communications over a first connection, to receive a control message designating a second connection, and, in response to the control message, to connect the user communications to the second connection.

The present invention further is directed to a system for connecting a call having user communications and call signaling. The system comprises a signaling processor that is adapted to receive the call signaling, to process the call signaling to select a connection for the user communications, and to transmit a control message designating the selected connection. The system also has a controllable time division multiplex matrix that is adapted to receive the user communications, to receive the control message designating the selected connection, and, in response to the control message, to connect the user communications to the selected connection.

Further, the invention is directed to a system for connecting a call having user communications and call signaling. The system comprises a signaling processor that is adapted to receive the call signaling, to process the call signaling to select connections for the user communications, and to transmit control messages designating the selected connections. A controllable time division multiplex matrix is adapted to receive the user communications, to receive from the signaling processor a first control message designating a selected first connection, and, in response to the first control message, to connect the user communications to the selected first connection. An interworking unit is adapted to receive the user communications over the selected first connection, to receive from the signaling processor a second control message designating a selected second connection, and, in response to the second control message, to interwork the user communications to the selected second connection. A controllable asynchronous transfer mode matrix is adapted to receive the user communications over the second connection, to receive from the signaling processor a third control message designating a selected third connection, and, in response to the third control message, to connect the user communications to the selected third connection.

Further, the present invention is directed to a system for connecting a call having user communications and call signaling. The system comprises a signaling processor that is adapted to receive the call signaling, to process the call signaling to select a connection for the user communications, and to transmit a control message designating the selected connection. The system also has a controllable time division multiplex matrix that is adapted to receive the user communications, to receive from the signaling processor the control message designating a selected connection, and, in response to the control message, to connect the user communications to the selected connection. The system also has an interworking unit that is adapted to receive the user communications over the selected first connection and to interwork the user communications to a second connection.

Also, the present invention is directed to a system for connecting a call having user communications and call signaling. The system comprises a signaling processor that is adapted to receive the call signaling, to process the call signaling to select a connection for the user communications, and to transmit a control message designating the selected connection. A controllable time division multiplex matrix has a plurality of incoming connections over which to receive user communications and a plurality of outgoing connections over which to connect the user communications from the incoming connections. The controllable time division matrix is adapted to receive the user communications over a particular one of the incoming connections, to receive the control message designating the selected connection, and, in response to the control message, to connect the user communications to the selected connection. The selected connection is a particular one of the outgoing connections.

Still further, the present invention is directed to a method for connecting a call having user communications and call signaling. The call signaling is processed to select a connection for the call. The method comprises receiving the user communications over a time division multiplex connection at a time division multiplex matrix and receiving a control message at the time division multiplex matrix. In response to the control message, the user communications are connected to the selected connection. The selected connection comprises another time division multiplex connection. The time division multiplex matrix is on a platform separate from a device which processed the call signaling to select the connection.

Also, the present invention is directed to a method for connecting a call having user communications and call signaling. The method comprises processing the call signaling to select a connection for the call. A control message designating the connection is transmitted. The user communications are received at a time division multiplex matrix, and the control message is received at the time division multiplex matrix. In response to the control message, the user communications are connected to the selected connection.

BRIEF DESCRIPTION OF THE DRAWINGS

FIG. 1 is a block diagram of a call connection system having an interworking system in accordance with an embodiment of the present invention.

FIG. 2 is a block diagram of a call connection system having a time division multiplex matrix in accordance with an embodiment of the present invention.

FIG. 6 is a functional diagram of an asynchronous transfer mode interworking unit for use with a synchronous optical network system in accordance with the present invention.

FIG. 7 is a functional diagram of an asynchronous transfer mode interworking unit for use with a synchronous digital hierarchy system in accordance with the present invention.

FIG. 13 is a table diagram of a time division multiplex trunk circuit table used in the signaling processor of FIG. 8.

FIG. 14 is a table diagram of an asynchronous transfer mode trunk circuit table used in the signaling processor of FIG. 8.

FIG. 15A is a table diagram of a trunk group table used in the signaling processor of FIG. 8.

FIG. 15B is a continuation table diagram of the trunk group table of FIG. 15A.

FIG. 15C is a continuation table diagram of the trunk group table of FIG. 15B.

FIG. 16 is a table diagram of a carrier table used in the signaling processor of FIG. 8.

FIG. 17 is a table diagram of an exception table used in the signaling processor of FIG. 8.

FIG. 18 is a table diagram of an originating line information table used in the signaling processor of FIG. 8.

FIG. 19 is a table diagram of an automated number identification table used in the signaling processor of FIG. 8.

FIG. 20 is a table diagram of a called number screening table used in the signaling processor of FIG. 8.

FIG. 21 is a table diagram of a called number table used in the signaling processor of FIG. 8.

FIG. 22 is a table diagram of a day of year table used in the signaling processor of FIG. 8.

FIG. 23 is a table diagram of a day of week table used in the signaling processor of FIG. 8.

FIG. 24 is a table diagram of a time of day table used in the signaling processor of FIG. 8.

FIG. 25 is a table diagram of a time zone table used in the signaling processor of FIG. 8.

FIG. 26 is a table diagram of a routing table used in the signaling processor of FIG. 8.

FIG. 27 is a table diagram of a trunk group class of service table used in the signaling processor of FIG. 8.

FIG. 28 is a table diagram of a treatment table used in the signaling processor of FIG. 8.

FIG. 29 is a table diagram of an outgoing release table used in the signaling processor of FIG. 8.

FIG. 30 is a table diagram of a percent control table used in the signaling processor of FIG. 8.

FIG. 31 is a table diagram of a call rate table used in the signaling processor of FIG. 8.

FIG. 32 is a table diagram of a database services table used in the signaling processor of FIG. 8.

FIG. 33A is a table diagram of a signaling connection control part table used in the signaling processor of FIG. 8.

FIG. 33B is a continuation table diagram of the signaling connection control part table of FIG. 33A.

FIG. 33C is a continuation table diagram of the signaling connection control part table of FIG. 33B.

FIG. 33D is a continuation table diagram of the signaling connection control part table of FIG. 33C.

FIG. 34 is a table diagram of an intermediate signaling network identification table used in the signaling processor of FIG. 8.

FIG. 35 is a table diagram of a transaction capabilities application part table used in the signaling processor of FIG. 8.

FIG. 36 is a table diagram of a external echo canceller table used in the signaling processor of FIG. 8.

FIG. 37 is a table diagram of an interworking unit table used in the signaling processor of FIG. 8.

FIG. 38 is a table diagram of a controllable asynchronous transfer mode matrix interface table used in the signaling processor of FIG. 8.

FIG. 39 is a table diagram of a controllable asynchronous transfer mode matrix table used in the signaling processor of FIG. 8.

FIG. 40A is a table diagram of a site office table used in the signaling processor of FIG. 8.

FIG. 40B is a continuation table diagram of the site office table of FIG. 40A.

FIG. 40C is a continuation table diagram of the site office table of FIG. 40B.

FIG. 40D is a continuation table diagram of the site office table of FIG. 40C.

FIG. 41A is a table diagram of an advanced intelligent network event parameters table used in the signaling processor of FIG. 8.

FIG. 41B is a continuation table diagram of the advanced intelligent network event parameters table of FIG. 41A.

FIG. 42 is a table diagram of a message mapping table used in the signaling processor of FIG. 8.

DETAILED DESCRIPTION

Figure 3:
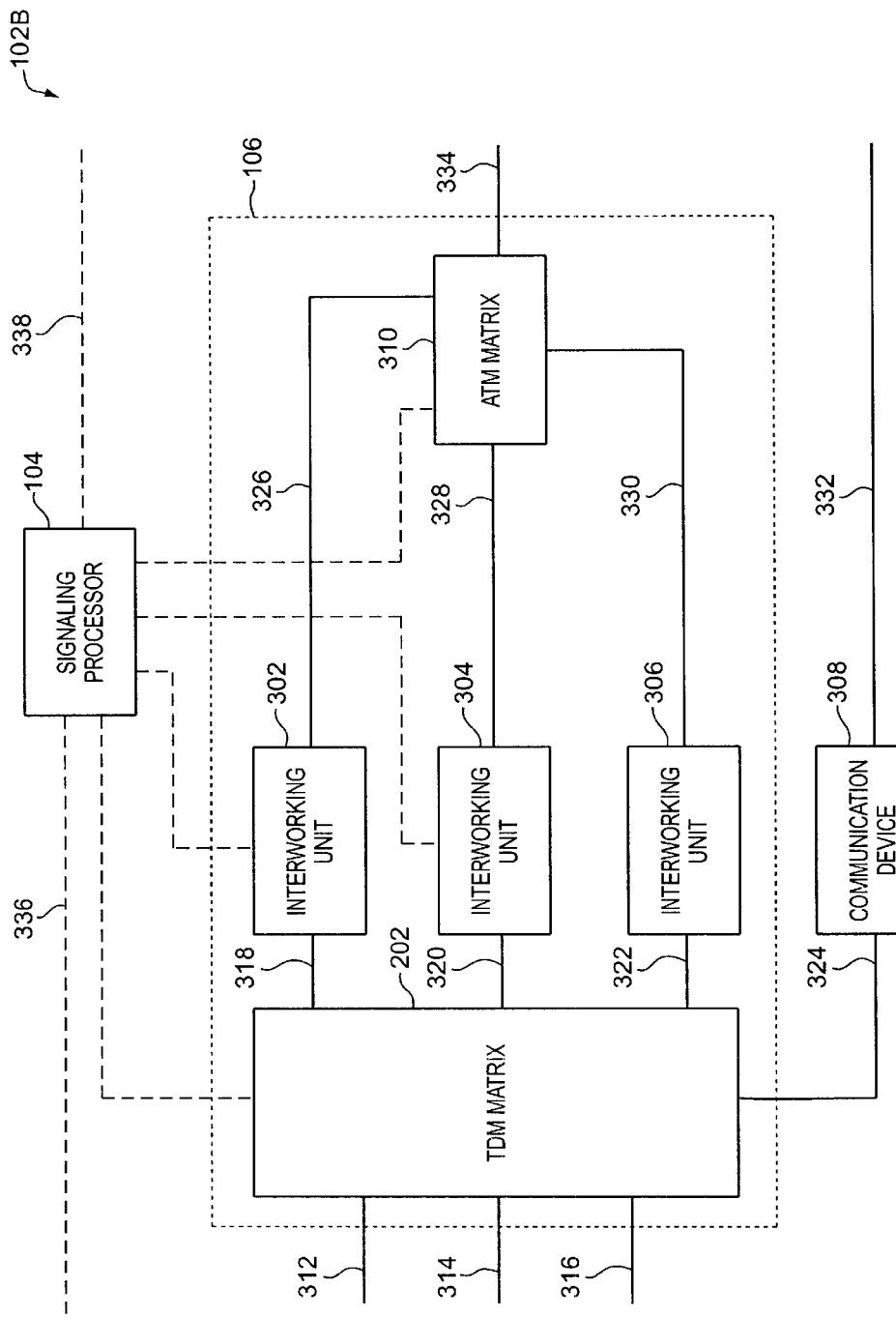
FIG. 3 is a block diagram of a call connection system having a time division multiplex matrix and an asynchronous transfer mode matrix in accordance with an embodiment of the present invention.

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on flu recommendation Q.931. A call can be connected to and from communication devices.

Connections are used to transport user communications and other device information between communication devices and between the elements and devices of the system. The term "connection" as used herein means the transmission media used to carry user communications between elements of the various telecommunications networks and systems. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an asynchronous transfer mode (ATM) adaptation layer 5 (AAL5) data link, user datagram protocol/internet protocol (UDP/IP), ethernet, digital signal level zero (DS0), or digital signal level one (DS1). In addition, a link, as shown in the figures, can represent a single physical link or multiple links, such as one link or a combination of links of ISDN, SS7, transmission control protocol/internet protocol (TCP/IP), or some other data link. The term "control message" as used herein means a control or signaling message, a control or signaling instruction, or a control or signaling signal, whether proprietary or standardized, that conveys information from one point to another.

The present invention connects calls by using a controllable TDM matrix. The TDM matrix provides flexibility in routing calls through networks. Because the TDM matrix can connect to multiple communication devices, the communication devices do not have to be otherwise interconnected. Moreover, because the TDM matrix is a controllable matrix, connections can be made on a call-by-call basis through a system, thereby eliminating or reducing the need for nailed up connections from specific communications devices through the TDM matrix to other specific communication devices.

FIG. 1 illustrates an exemplary embodiment of the present invention. The call connection system 102 of FIG. 1 comprises a signaling processor 104 and an interworking system 106 linked by a link 108. A first communication device 110 and a second communication device 112 are connected to the interworking system 106 through connections 114 and 116 and linked through links 118 and 120, respectively.

The signaling processor 104 is a signaling platform that can receive, process, and generate call signaling. Based on the processed call signaling, the signaling processor 104 selects processing options, services, or resources for the user communications and generates and transmits control messages that identify the communication device, processing option, service, or resource that is to be used. The signaling processor 104 also selects virtual connections and circuit-based connections for call routing and generates and transports control messages that identify the selected connections. The signaling processor 104 can process various forms of signaling, including ISDN, GR-303, B-ISDN, SS7, and C7.

The interworking system 106 makes connections for calls. The interworking system 106 may interwork user communications to connections or switch user communications between connections. Preferably, interworking occurs between time division multiplex (TDM) connections and asynchronous transfer mode (ATM) connections, and switching occurs between TDM connections and other TDM connections and between ATM connections and other ATM connections. The interworking system 106 establishes connections for user communications in response to control messages from the signaling processor 104.

The communication devices 110 and 112 comprise customer premises equipment (CPE), a service platform, a switch, a remote digital terminal, a cross connect, an interworking unit, an ATM gateway, or any other device capable of initiating, handling, or terminating a call. CPE can be, for example, a telephone, a computer, a facsimile machine, or a private branch exchange. A service platform can be, for example, any enhanced computer platform that is capable of processing calls. A switch can be, for example, a TDM switch or an ATM switch. A remote digital terminal is a device that concentrates analog twisted pairs from telephones and other like devices and converts the analog signals to a digital format known as GR-303. An ATM gateway is a device that changes ATM cell header virtual path/virtual channel (VP/VC) identifiers. The communication devices 110 and 112 may be TDM based or ATM based.

The system of FIG. 1 operates as follows. The first communication device 110 transmits call signaling to the signaling processor 104 and transports user communications to the interworking system 106.

The signaling processor 104 receives the call signaling over the link 118 and processes the user communications to determine a connection for the call. The signaling processor 104 determines that the user communications are to be connected over the connection 116. The signaling processor 104 transmits a control message to the interworking system 106 designating the selected connection 116. The signaling processor 104 also transmits call signaling to the second communication device 112 identifying the connection 116 over which the user communications will be connected.

The interworking system 106 receives the control message from the signaling processor 104 and the user communications from the first communication device 110 over the connection 114. The interworking system 106 connects the user communications from the connection 114 to the connection 116 in-response to the control message.

The second communication device 112 receives the call signaling over the link 120 from the signaling processor 104. In addition, the second communication device 112 receives the user communications over the connection 116 from the interworking system 106.

FIG. 2 illustrates an exemplary embodiment of a call connection system 102A in which the call connection system comprises a TDM matrix 202 and an interworking unit 204. Optionally, the call connection system 102A may be configured with an optional digital signal processing device, such as an external echo control 206 on the incoming side of the TDM matrix 202 or an external echo control 208 between the TDM matrix 202 and the interworking unit 204. Although, it will be appreciated that other digital signal processing devices may be present in place of, or in addition to, the echo control, such as a converter, a compression device, or an encryption device. Also, it will be appreciated that echo control and other digital signal processing, such as encryption, compression, and converter processing, can be incorporated in the TDM matrix 202 and/or the interworking unit 204.

The TDM matrix 202 and the interworking unit 204 are linked to the signaling processor 104 by links 210 and 212, respectively. The optional echo controls 206 and 208 would have a link 214 and 216 if added to the configuration.

A connection 218 connects the communication device 110 to the TDM matrix 202. An additional connection 220 extends from the TDM matrix 202. If the optional echo control 206 is present in the system, the connection 220 extends from the TDM matrix 202 to the echo control, and from the echo control. Also, an additional connection 222 extends from the interworking unit 204. In addition, two connections 224 and 226 connect the TDM matrix 202 and the interworking unit 204. If the optional echo control 208 is present in the system, the connection 226 extends from the TDM matrix 202 to the echo control, and from the echo control to the interworking unit 204.

The TDM matrix 202 is a controllable TDM matrix that establishes connections in response to control messages received from the call processor 104. The TDM matrix 202 can switch calls from TDM connections to other TDM connections. Typically, the TDM connections are assignments between a DS0 and another DS0. The TDM matrix 202 establishes the connections on a real-time call-by-call basis. The TDM matrix 202 can transmit and receive call signaling and user communications over the connections. The TDM matrix 202 may be external to the signaling processor 104 or other call processing module so that it is on a separate platform. The TDM matrix 202 may be configured to provide digital signal processing, such as converter processing, echo control, compression, and encryption.

The TDM matrix 202 can be configured with various types of interfaces. For example, the TDM matrix 202 can have one or more of a digital signal level one (DS1), DS3, optical carrier level three (OC-3), OC-12, OC-48, synchronous transfer signal one (STS-1), STS-3, or other DS level, OC level, or STS level interfaces. In addition, the TDM matrix 202 can be configured with European level connections or Japanese level connections, such as European level 1 (E1), E3, synchronous transport module one (STM-1), STM-3, or other E level or STM level connections. In some configurations, the TDM matrix 202 can be configured with internet protocol (IP) interfaces for IP interworking and IP switching.

The interworking unit 204 interworks traffic between various protocols. Preferably, the interworking unit 204 interworks between ATM traffic and non-ATM traffic, such as TDM traffic. The interworking unit 204 operates in accordance with control messages received from the signaling processor 104. These control messages typically are provided on a call-by-all basis and typically identify an assignment between a DS0 and a VP/VC for which user communications are interworked. In some instances, the interworking unit 204 may transport control messages which may include data to the signaling processor 104. The interworking unit 204 may be configured to provide digital signal processing, such as converter processing, echo control, compression, and encryption.

The interworking unit 204 may be configured so that the connections extending to and from the interworking unit are hardwired and no switching is required at the interworking unit. In such a configuration, the connections are provisioned so that a call on a particular TDM connection is interworked to a particular ATM connection without requiring a control message from the signaling processor 104 designating the particular connections. This type of configuration conserves processing in the interworking unit. In this type of configuration, a control link can be provided to the interworking unit 204 from the signaling processor 104 for echo control and digital signal processing.

The echo controls 206 and 208 control echo for echo cancellation and echo addition. The echo controls 206 and 208 are operated on a call-by-call basis in response to control messages from the signaling processor 104. Although, the echo controls 206 and 208 may be configured to operate on each call it receives without the need for a control message from the signaling processor 104. In addition, other types of digital signal processors may exist in place of the echo controls 206 and 208, such as compression devices, encryption devices, and signal converters.

The system of FIG. 2 operates as follows. In a first example, the first communication device 110 transmits call signaling and transports user communications. The call signaling is received by the signaling processor 104. The signaling processor 104 processes the call signaling to determine connections for the call. The signaling processor 104 determines that the call is to be connected through the TDM matrix 202, to the interworking unit 204 through the connection 224, and to the connection 222. The signaling processor 104 transmits control messages to the TDM matrix 202 identifying the connection 218 and the connection 224 and to the interworking unit 204 identifying the connection 224 and the connection 222.

The TDM matrix 202 receives the user communications over the connection 218 and receives the control message from the signaling processor 104 over the link 210. In response to the control message, the TDM matrix 202 connects the user communications from the connection 218 to the connection 224.

The interworking unit 204 receives the user communications over the connection 224 and receives the control message from the signaling processor 104 over the link 212. In this example, the control message specifies a selected VP/VC on the connection 222. In response to the control message, the interworking unit 204 interworks the user communications to the selected VP/VC on the connection 222.

In another example, the call connection system 102A is configured with an optional digital signal processing device, such as the echo control 206, located on the incoming side of the TDM matrix 202. Although, it will be appreciated that other digital signal processors, such as converters, encryption devices, and compression devices may exist in place of, or in addition to, the echo control 206.

Call signaling is received by the signaling processor 104 over a link. The signaling processor 104 processes the call signaling to determine connections for the call. The signaling processor 104 determines that the call is to be connected from a connection 220, through the echo control 206 and the TDM matrix 202 to the interworking unit 204 through the connection 226, and to the connection 222. The signaling processor 104 transmits control messages to the TDM matrix 202 identifying the connection 220 and the connection 226, to the interworking unit 204 identifying the connection 226 and the connection 222, and to the echo control 206 specifying the appropriate control for echo. In this example, echo is to be canceled The echo control 206 receives the user communications over the connection 220 and receives the control message from the signaling processor 104 over the link 214. In response to the control message, the echo control 206 cancels the echo for the user communications.

The TDM matrix 202 receives the user communications from the echo control 206 and receives the control message from the signaling processor 104 over the link 210. In response to the control message, the TDM matrix 202 connects the user communications to the connection 226.

The interworking unit 204 receives the user communications over the connection 226 and receives the control message from the signaling processor 104 over the link 212. In this example, the control message specifies a selected VP/VC on the connection 222. In response to the control message, the interworking unit 204 interworks the user communications from the connection 226 to the selected VP/VC on the connection 222.

Referring still to FIG. 2, in yet another example, the call connection system 102A is configured with an optional digital signal processing device, such as the echo control 208, located between the TDM matrix 202 and the interworking unit 204. Although, it will be appreciated that other digital signal processors, such as converters, encryption devices, and compression devices may exist in place of, or in addition to, the echo control 208.

Call signaling is received by the signaling processor 104 over a link. The signaling processor 104 processes the call signaling to determine connections for the call. The signaling processor 104 determines that the call is to be connected from a connection 220, through the TDM matrix 202 to the connection 224, through the echo control 208 and the interworking unit 204, and to the connection 222. The signaling processor 104 transmits control messages to the TDM matrix 202 identifying the connection 220 and the connection 224, to the interworking unit 204 identifying the connection 224 and the connection 222, and to the echo control 208 specifying the appropriate control for echo. In this example, echo is to be canceled The TDM matrix 202 receives the user communications over the connection 220 and receives the control message from the signaling processor 104 over the link 210. In response to the control message, the TDM matrix 202 connects the user communications to the connection 224.

The echo control 208 receives the user communications over the connection 224 and receives the control message from the signaling processor 104 over the link 216. In response to the control message, the echo control 208 cancels the echo for the user communications.

The interworking unit 204 receives the user communications from the echo control 208 and receives the control message from the signaling processor 104 over the link 212. In this example, the control message specifies a selected VP/VC on the connection 222. In response to the control message, the interworking unit 204 interworks the user communications from the connection 224 to the selected VP/VC on the connection 222.

FIG. 3 illustrates an exemplary embodiment of a call connection system 102B in which the TDM matrix 202 is connected to multiple components. In addition to the signaling processor 104 and the TDM matrix 202, the call connection system 102B comprises a first interworking unit 302, a second interworking unit 304, a third interworking unit 306, a communication device 308, and an ATM matrix 310. The call connection system 102B can be configured with external digital signal processing devices, such as echo controllers, encryption devices, compression devices, or converters, as in the system of FIG. 2. It will be appreciated that the ATM matrix 310 may be connected to a communication device (not shown), as in FIG. 1. The communication device may be an ATM communication device.

Three connections 312, 314, and 316 extend from the TDM matrix 202. Connections 318, 320, and 322 connect the TDM matrix 202 to the first, second, and third interworking units 302, 304, and 306. A connection 324 connects the TDM matrix 202 to the communication device 308. Connections 326, 328, and 330 connect the first, second, and third interworking units 302, 304, and 306 to the ATM matrix 310. Connections 332 and 334 extend from the communication device 308 and the ATM matrix 310, respectively. Links 336 and 338 extend from the signaling processor 104.

The signaling processor 104 and the TDM matrix 202 are the same as described above. Also, the first and second interworking units 302 and 304 are the same as the interworking unit described above.

The third interworking unit 306 interworks traffic between various protocols. Preferably, the third interworking unit 306 interworks between ATM traffic and non-ATM traffic, such as TDM traffic. The connections extending to and from the third interworking unit 306 are provisioned in a manner so that a call on a particular TDM connection is interworked to a particular ATM connection without requiring a control message from the signaling processor 104 designating the particular connections.

The communication device 308 comprises customer premises equipment (CPE), a service platform, a switch, a cross connect, an interworking unit, or any other device capable of initiating, handling, or terminating a call. In other embodiments, the communication device 308 may have a link to the signaling processor 104 over which the communication device can receive or transmit control messages or call signaling.

The ATM matrix 310 is a controllable ATM matrix that establishes connections in response to control messages received from the signaling processor 104. The ATM matrix 310 is able to interwork between ATM connections and TDM connections. The ATM matrix 310 cross connects ATM connections with other ATM connections. The ATM matrix 310 transmits and receives call signaling and user communications over connections.

It will be appreciated that the TDM matrix 202 provides the TDM to TDM connection switching. This allows the interworking units 302, 304, and 306 to focus on TDM to ATM interworking, thereby conserving resources by not providing TDM to TDM switching. Moreover, the ATM matrix 310 is operative to handle ATM connections and not TDM connections, thereby making the ATM matrix less expensive to build, more efficient to operate, and conserves the ATM matrix resources because the TDM matrix 202 handles the TDM traffic. Because the TDM matrix 202 provides only TDM to TDM connection switching, the TDM matrix likewise is more efficient and less expensive to build and operate as its resources are dedicated to the TDM switching.

For example, if the TDM matrix 202 was not present in the call connection system 102B, a communication device, such as a local exchange carrier (LEC) switch, could be connected to an interworking unit 302 through a connection 318 and through the interworking unit to the ATM matrix 310 through a connection 326. If the connection 326 to the ATM matrix 310 becomes congested, the switch would not be able to complete the call through the connections 318 and 326.

In another example, to reduce the possibility of the above situation, two interworking units can be used. A connection can be made from the switch to the first interworking unit. A second connection can be configured from the first interworking unit to the second interworking unit. Outgoing connections can be configured from each of the interworking units. If the outgoing connection from the first interworking unit becomes congested, then the call can be connected from the first interworking unit to the second interworking unit and from the outgoing connection on the second interworking unit. However, this configuration also is not the most efficient use of resources.

In addition, if compression is to be used on the call, resources are more efficiently used if incoming connections are dedicated to outgoing connections. Thus, where two incoming connections on an interworking unit are used for one outgoing connection on the interworking unit, resources for the interworking unit are not maximally efficiently used. This is the case with the above configuration where the second incoming connection is configured to connect from the first interworking unit to the second interworking unit.

In another example, if the TDM matrix is not present, the switch is connected to two interworking units. A first incoming connection 318 is configured from the switch through the first interworking unit 302 with a first outgoing connection 326. A second incoming connection 320 is configured from the same switch through the second interworking unit 304 with a second outgoing connection 328. With this configuration, if the first outgoing connection 326 becomes congested, the call could be routed over the second incoming connection 320 through the second interworking unit 304 and through the second outgoing connection. However, if the second outgoing connection 328 becomes congested, the call cannot be completed. In addition, it is not realistic for a switch to have multiple different connections, such as different OC pipes, to multiple interworking units. This configuration is not the most efficient use of resources for transmitting calls from TDM connections to TDM connections.

The call connection system 102B with the TDM matrix 202 more efficiently uses the system resources. Connections can be configured through the TDM matrix 202 on a real-time call-by-call basis. With this configuration, a communication device, such as a LEC switch, need only one connection to the call connection system 102B without having to consider congested connections within the call connection system. Although, to guard against a congested connection between the switch and the call connection system 102B, other connections may be needed.

The call connection system 102B of FIG. 3 operates as follows. In a first example, call signaling is received by the signaling processor 104. The signaling processor 104 processes the call signaling to determine connections for the call. The signaling processor 104 determines that the call is to be connected through the TDM matrix 202 to the first interworking unit 302 through the connection 318, to the ATM matrix 310 through the connection 326, and to the connection 334. The signaling processor 104 transmits control messages to the TDM matrix 202 identifying the incoming connection 314 and the outgoing connection 318, to the first interworking unit 302 identifying the incoming connection 318 and the outgoing connection 326, and to the ATM matrix 310 identifying the incoming connection 326 and the outgoing connection 334.

In this example, the digital signal processing device, such as the echo control, resides in the TDM matrix 202. Thus, the signaling processor 104 transmits a control message to the TDM matrix 202 specifying the required digital signal processing. In this example, the signaling processor 104 specifies that echo control is to be applied to the user communications. Although, it will be appreciated that other digital signal processing may be specified, such as compression or encryption. Also, it will be appreciated that the signaling processor 104 may specify the digital signal processing in the same control message as the identification of the connections 314 and 318 or in a separate control message. In this example, a single control message specifies both the connections 314 and 318 and the echo control.

The TDM matrix 202 receives the user communications over the connection 314 and receives the control message from the signaling processor 104. In response to the control message, the TDM matrix 202 applies echo control to the user communications and connects the user communications from the connection 314 to the connection 318.

The first interworking unit 302 receives the user communications over the connection 318 and receives the control message from the signaling processor 104. In this example, the control message specifies a selected VP/VC on the connection 326. In response to the control message, the first interworking unit 302 interworks the user communications to the selected VP/VC on the connection 326.

The ATM matrix 310 receives the user communications over the connection 326 and the control message from the signaling processor 104. In this example, the control message specifies a selected VP/VC on the connection 334. In response to the control message, the ATM matrix 310 connects the user communications from the VP/VC on the connection 326 to the selected VP/VC on the connection 334.

Still referring to FIG. 3, in another example, call signaling is received by the signaling processor 104. The signaling processor 104 processes the call signaling to determine connections for the call. The signaling processor 104 determines that the call is to be connected through the TDM matrix 202 to the second interworking unit 304 through the connection 320, to the ATM matrix 310 through the connection 328, and to the connection 334. The signaling processor 104 transmits control messages to the TDM matrix 202 identifying the incoming connection 312 and the outgoing connection 320, to the second interworking unit 304 identifying the incoming connection 320 and the outgoing connection 328, and to the ATM matrix 310 identifying the incoming connection 328 and the outgoing connection 334.

In this example, the digital signal processing device, such as the echo control, resides in the second interworking unit 304. Thus, the signaling processor 104 transmits a control message to the second interworking unit 304 specifying the required digital signal processing. In this example, the signaling processor 104 specifies that echo control and compression is to be applied to the user communications. Although, it will be appreciated that other digital signal processing may be specified, such as encryption. Also, it will be appreciated that the signaling processor 104 may specify the digital signal processing in the same control message as the identification of the connections 312 and 320 or in a separate control message. In this example, a single control message specifies both the connections 312 and 320 and the digital signal processing.

The TDM matrix 202 receives the user communications over the connection 312 and receives the control message from the signaling processor 104. In response to the control message, the TDM matrix 202 connects the user communications from the connection 312 to the connection 320.

The second interworking unit 304 receives the user communications over the connection 320 and receives the control message from the signaling processor 104. In this example, the control message specifies a selected VP/VC on the connection 328. In response to the control message, the second interworking unit 304 applies echo control and compression to the user communications and interworks the user communications to the selected VP/VC on the connection 328.

The ATM matrix 310 receives the user communications over the connection 328 and the control message from the signaling processor 104. In this example, the control message specifies a selected VP/VC on the connection 334. In response to the control message, the ATM matrix 310 connects the user communications from the VP/VC on the connection 328 to the selected VP/VC on the connection 334.

With reference still to FIG. 3, in another example, call signaling is received by the signaling processor 104. The signaling processor 104 processes the call signaling to determine connections for the call. The signaling processor 104 determines that the call is to be connected through the TDM matrix 202 to the second interworking unit 304 through the connection 320, to the ATM matrix 310 through the connection 328, and to the connection 334. The signaling processor 104 transmits control messages to the TDM matrix 202 identifying the incoming connection 312 and the outgoing connection 320 and to the ATM matrix 310 identifying the incoming connection 328 and the outgoing connection 334.

In this example, the second interworking unit 304 does not make connections in response to a control message from the signaling processor 104. Instead, the second interworking unit 304 is configured to connect an incoming connection to a pre-selected outgoing connection without the need for a control message from the signaling processor 104 specifying the connections.

Also, in this example, the digital signal processing device, such as the echo control, resides in the second interworking unit 304. The second interworking unit 304 can be configured to apply the digital signal processing to all calls or on a basis specified by the signaling processor 104. In this example, the second interworking unit 304 is configured to apply the digital signal processing to those calls designated by a control message from the signaling processor 104. Thus, the signaling processor 104 transmits a control message over the link to the second interworking unit 304 specifying the required digital signal processing. In this example, the signaling processor 104 specifies that encryption is to be applied to the user communications. Although, it will be appreciated that other digital signal processing may be specified, such as echo control and compression.

The TDM matrix 202 receives the user communications over the connection 312 and receives the control message from the signaling processor 104. In response to the control message, the TDM matrix 202 connects the user communications from the connection 312 to the connection 320.

The second interworking unit 304 receives the user communications over the connection 320 and receives the control message from the signaling processor 104. The second interworking unit 304 applies encryption to the user communications and interworks the user communications to the pre-selected VP/VC on the connection 328.

The ATM matrix 310 receives the user communications over the connection 328 and the control message from the signaling processor 104. In this example, the control message specifies a selected VP/VC on the connection 334. In response to the control message, the ATM matrix 310 connects the user communications from the VP/VC on the connection 328 to the selected VP/VC on the connection 334.

In yet another example, call signaling is received by the signaling processor 104. The signaling processor 104 processes the call signaling to determine connections for the call. The signaling processor 104 determines that the call is to be connected through the TDM matrix 202 to the third interworking unit 306 through the connection 322, to the ATM matrix 310 through the connection 330, and to the connection 334. The signaling processor 104 transmits control messages to the TDM matrix 202 identifying the incoming connection 316 and the outgoing connection 322 and to the ATM matrix 310 identifying the incoming connection 330 and the outgoing connection 334.

In this example, the third interworking unit 306 does not make connections in response to a control message from the signaling processor 104. Instead, the third interworking unit 306 is configured to connect an incoming connection to a preselected outgoing connection without the need for a control message from the signaling processor 104 specifying the connections.

Also, in this example, the third interworking unit 306 may be configured with or without digital signal processing devices. If the third interworking device 306 is configured with digital signal processing devices, the third interworking unit can be configured to apply the digital signal processing to all calls. In this example, a digital signal processing device, such as the echo control, resides in the third interworking unit 306, and the third interworking unit 306 is configured to apply the digital signal processing to all calls. In this example, echo control is to be applied to the user communications. Although, it will be appreciated that other digital signal processing may be used, such as encryption and compression.

The TDM matrix 202 receives the user communications over the connection 316 and receives the control message from the signaling processor 104. In response to the control message, the TDM matrix 202 connects the user communications from the connection 316 to the connection 322.

The third interworking unit 306 receives the user communications over the connection 322. The third interworking unit 306 applies echo control to the user communications and interworks the user communications to the pre-selected VP/VC on the connection 330.

The ATM matrix 310 receives the user communications over the connection 330 and the control message from the signaling processor 104. In this example, the control message specifies a selected VP/VC on the connection 334. In response to the control message, the ATM matrix 310 connects the user communications is from the VP/VC on the connection 330 to the selected VP/VC on the connection 334.

Again referring to FIG. 3, in another example, call signaling is received by the signaling processor 104. The signaling processor 104 processes the call signaling to determine connections for the call. The signaling processor 104 determines that the call is to be connected through the TDM matrix 202 from the connection 312 to the connection 314. The signaling processor 104 transmits a control message to the TDM matrix 202 identifying the incoming connection 312 and the outgoing connection 314.

In this example, the TDM matrix 202 may be configured with or without digital signal processing. In this example, no digital signal processing is required for the call.

The TDM matrix 202 receives the user communications over the connection 312 and receives the control message from the signaling processor 104. In response to the control message, the TDM matrix 202 connects the user communications from the connection 312 to the connection 314.

In still another example, call signaling is received by the signaling processor 104. The signaling processor 104 processes the call signaling to determine connections for the call. The signaling processor 104 determines that the call is to be connected through the TDM matrix 202 to the communication device 308 through the connection 324. The signaling processor 104 transmits a control message to the TDM matrix 202 identifying the incoming connection 314 and the outgoing connection 324.

In this example, the TDM matrix 202 may be configured with or without digital signal processing. In this example, no digital signal processing is to be applied to the user communications.

The TDM matrix 202 receives the user communications over the connection 314 and receives the control message from the signaling processor 104. In response to the control message, the TDM matrix 202 connects the user communications from the connection 314 to the connection 324.

The communication device 308 receives the user communications over the connection 324. In this example, the communication device 308 is a switch. Although, in other examples the communication device 308 may be another communication device, such as a service platform, other resource, or a CPE.

It will be appreciated that calls may be connected in a direction opposite of the examples above. Thus, for example, a call may be connected from the ATM matrix 310, through the first interworking unit 302, through the TDM matrix 202, and to any of the connections 312, 314, 316, and 324. Likewise, for example, a call may be connected from the ATM matrix 310, through the second interworking unit 304, through the TDM matrix 202, and to any of the connections 312, 314, 316, and 324. In addition, for example, a call may be connected from the ATM matrix 310, through the third interworking unit 306, through the TDM matrix 202, and to any of the connections 312, 314, 316, and 324. Any other combinations can be made.

THE CONTROLLABLE ATM MATRIX

Figure 4:
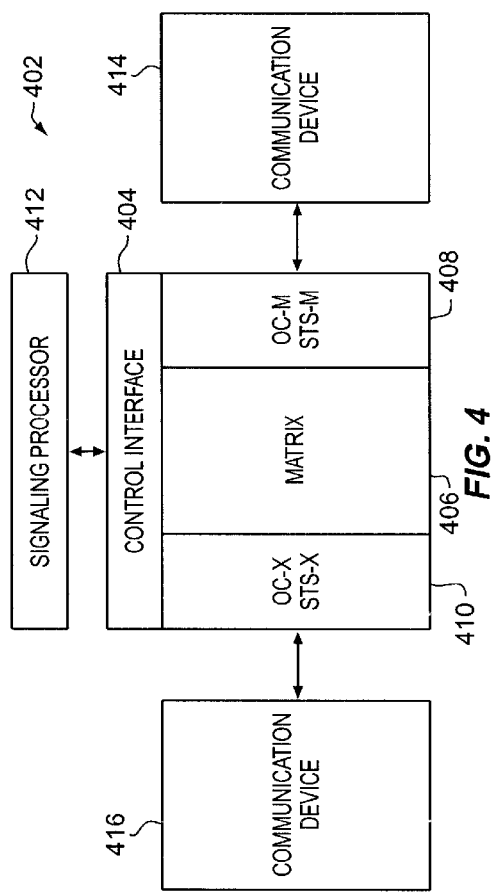
FIG. 4 is a functional diagram of a controllable asynchronous transfer mode matrix in accordance with the present invention.

FIG. 4 illustrates an exemplary embodiment of a controllable asynchronous transfer mode (ATM) matrix (CAM), but other CAMs that support the requirements of the invention also are applicable. The CAM 402 may receive and transmit ATM formatted user communications or call signaling.

The CAM 402 preferably has a control interface 404, a controllable ATM matrix 406, an optical carrier-M/synchronous transport signal-M (OC-M/STS-M) interface 408, and an OC-X/STS-X interface 410. As used herein in conjunction with OC or STS, "M" refers to an integer, and "X" refers to an integer.

The control interface 404 receives control messages originating from the signaling processor 412, identifies virtual connection assignments in the control messages, and provides these assignments to the matrix 406 for implementation. The control messages may be received over an ATM virtual connection and through either the OC-M/STS-M interface 408 or the OC-X/STS-X interface 410 through the matrix 406 to the control interface 404, through either the OC-M/STS-M interface or the OC-X/STS-X interface directly to the control interface, or through the control interface from a link.

The matrix 406 is a controllable ATM matrix that provides cross connect functionality in response to control messages from the signaling processor 412. The matrix 406 has access to virtual path/virtual channels (VP/VCs) over which it can connect calls. For example, a call can come in over a VP/VC through the OC-M/STS-M interface 408 and be connected through the matrix 406 over a VP/VC through the OC-X/STS-X interface 410 in response to a control message received by the signaling processor 412 through the control interface 404. Alternately, a call can be connected in the opposite direction. In addition, the a call can be received over a VP/VC through the OC-M/STS-M interface 408 or the OC-X/STS-X interface 410 and be connected through the matrix 406 to a different VP/VC on the same OC-M/STS-M interface or the same OC-X/STS-X interface.

The OC-M/STS-M interface 408 is operational to receive ATM cells from the matrix 406 and to transmit the ATM cells over a connection to the communication device 414. The OC-M/STS-M interface 408 also may receive ATM cells in the OC or STS format and transmit them to the matrix 406.

The OC-X/STS-X interface 410 is operational to receive ATM cells from the matrix 406 and to transmit the ATM cells over a connection to the communication device 416. The OC-X/STS-X interface 410 also may receive ATM cells in the OC or STS format and transmit them to the matrix 406.

Call signaling may be received through and transferred from the OC-M/STS-M interface 408. Also, call signaling may be received through and transferred from the OC-X/STS-X interface 410. The call signaling may be connected on a connection or transmitted to the control interface directly or via the matrix 406.

The signaling processor 412 is configured to send control messages to the CAM 402 to implement particular features on particular VP/VC circuits. Alternatively, lookup tables may be used to implement particular features for particular VP/VCs.

Figure 5:
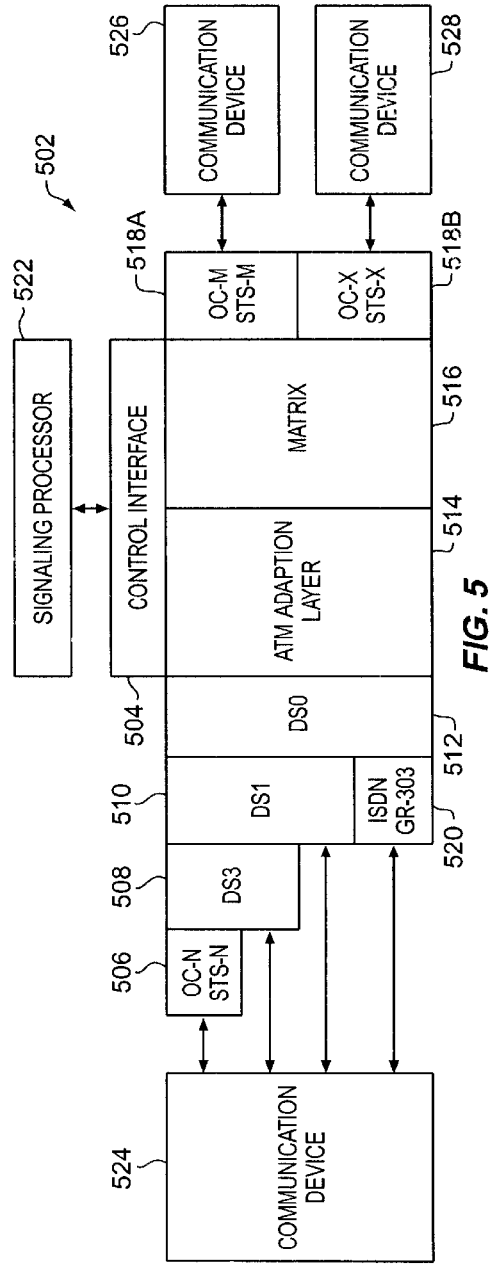
FIG. 5 is a functional diagram of a controllable asynchronous transfer mode matrix with time division multiplex capability in accordance with the present invention.

FIG. 5 illustrates another exemplary embodiment of a CAM which has time division multiplex (TDM) capability, but other CAMs that support the requirements of the invention also are applicable. The CAM 502 may receive and transmit in-band and out-of-band signaled calls.

The CAM 502 preferably has a control interface 504, an OC-N/STS-N interface 506, a digital signal level 3 (DS3) interface 508, a DS1 interface 510, a DS0 interface 512, an ATM adaptation layer (AAL) 514, a controllable ATM matrix 516, an OC-M/STS-M interface 518A, an OC-X/STS-X interface 518B, and an ISDN/GR-303 interface 520. As used herein in conjunction with OC or STS, "N" refers to an integer, "M" refers to an integer, and "X" refers to an integer.

The control interface 504 receives control messages originating from the signaling processor 522, identifies DS0 and virtual connection assignments in the control messages, and provides these assignments to the AAL 514 or the matrix 516 for implementation. The control messages may be received over an ATM virtual connection and through the OC-M/STS-M interface 518A to the control interface 504, through the OC-X/STS-X interface 518B and the matrix 516 to the control interface, or directly through the control interface from a link.

The OC-N/STS-N interface 506, the DS3 interface 508, the DS1 interface 510, the DS0 interface 512, and the ISDN/GR-303 interface 520 each can receive user communications from a communication device 524. Likewise, the OC-M/STS-M interface 518A and the OC-X/STS-X interface 518B can receive user communications from the communication devices 526 and 528.

The OC-N/STS-N interface 506 receives OC-N formatted user communications and STS-N formatted user communications and converts the user communications to the DS3 format. The DS3 interface 508 receives user communications in the DS3 format and converts the user communications to the DS 1 format. The DS3 interface 508 can receive DS3s from the OC-N/STS-N interface 506 or from an external connection. The DS1 interface 510 receives the user communications in the DS1 format and converts the user communications to the DS0 format. The DS1 interface 510 receives DS1s from the DS3 interface 508 or from an external connection. The DS0 interface 512 receives user communications in the DS0 format and provides an interface to the AAL 514. The ISDN/GR-303 interface 520 receives user communications in either the ISDN format or the GR-303 format and converts the user communications to the DS0 format. In addition, each interface may transmit user communications in like manner to the communication device 524.

The OC-M/STS-M interface 518A is operational to receive ATM cells from the AAL 514 or from the matrix 516 and to transmit the ATM cells over a connection to the communication device 526. The OC-M/STS-M interface 518A also may receive ATM cells in the OC or STS format and transmit them to the AAL 514 or to the matrix 516.

The OC-X/STS-X interface 518B is operational to receive ATM cells from the AAL 514 or from the matrix 516 and to transmit the ATM cells over a connection to the communication device 528. The OC-X/STS-X interface 518B also may receive ATM cells in the OC or STS format and transmit them to the AAL 514 or to the matrix 516.

Call signaling may be received through and transferred from the OC-N/STS-N interface 506 and the ISDN/GR-303 interface 520. Also, call signaling may be received through and transferred from the OC-M/STS-M interface 518A and the OC-X/STS-X interface 518B. The call signaling may be connected on a connection or transmitted to the control interface directly or via an interface as explained above.

The AAL 514 comprises both a convergence sublayer and a segmentation and reassembly (SAR) sublayer. The AAL 514 obtains the identity of the DS0 and the ATM VP/VC from the control interface 504. The AAL 514 is operational to convert between the DS0 format and the ATM format. AALs are known in the art, and information about AALs is provided by International Telecommunications Union (ITU) documents in the series of I.363, which are incorporated herein by reference. For example, ITU document I.363.1 discusses AAL1. An AAL for voice calls is described in U.S. Pat. No. 5,806,553 entitled "Cell Processing for Voice Transmission," which is incorporated herein by reference.

Calls with multiple 64 Kilo-bits per second (Kbps) DS0s are known as N×64 calls. If desired, the AAL 514 can be configured to accept control messages through the control interface 504 for N×64 calls. The CAM 502 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 516 is a controllable ATM matrix that provides cross connect functionality in response to control messages from the signaling processor 522. The matrix 516 has access to VP/VCs over which it can connect calls. For example, a call can come in over a VP/VC through the OC-M/STS-M interface 518A and be connected through the matrix 516 over a VP/VC through the OC-X/STS-X interface 518B in response to a control message received by the signaling processor 522 through the control interface 504. Alternately, the matrix 516 may transmit a call received over a VP/VC through the OC-M/STS-M interface 518A to the AAL 514 in response to a control message received by the signaling processor 522 through the control interface 504. Communications also may occur in opposite directions through the various interfaces.

In some embodiments, it may be desirable to incorporate digital signal processing capabilities at, for example, the DS0 level. It also may be desired to apply echo control to selected DS0 circuits. In these embodiments, a signal processor may be included. The signaling processor 522 is configured to send control messages to the CAM 502 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

THE ATM INTERWORKING UNIT

FIG. 6 illustrates an exemplary embodiment of an interworking unit which is an ATM interworking unit 602 suitable for the present invention for use with a SONET system. Other interworking units that support the requirements of the invention also are applicable. The ATM interworking unit 602 may receive and transmit in-band and out-of-band calls.

The ATM interworking unit 602 preferably has a control interface 604, an OC-N/STS-N interface 606, a DS3 interface 608, a DS1 interface 610, a DS0 interface 612, a signal processor 614, an AAL 616, an OC-M/STS-M interface 618, and an ISDN/GR-303 interface 620. As used herein in conjunction with OC or STS, "N" refers to an integer, and "M" refers to an integer.

The control interface 604 receives control messages originating from the signaling processor 622, identifies DS0 and virtual connection assignments in the control messages, and provides these assignments to the AAL 616 for implementation. The control messages are received over an ATM virtual connection and through the OC-M/STS-M interface 618 to the control interface 604 or directly through the control interface from a link.

The OC-N/STS-N interface 606, the DS3 interface 608, the DS1 interface 610, the DS0 interface 612, and the ISDN/GR-303 interface 620 each can receive user communications from a communication device 624. Likewise, the OC-M/STS-M interface 618 can receive user communications from a communication device 626.

The OC-N/STS-N interface 606 receives OC-N formatted user communications and STS-N formatted user communications and demultiplexes the user communications to the DS3 format. The DS3 interface 608 receives user communications in the DS3 format and demultiplexes the user communications to the DS1 format. The DS3 interface 608 can receive DS3s from the OC-N/STS-N interface 606 or from an external connection. The DS1 interface 610 receives the user communications in the DS1 format and demultiplexes the user communications to the DS0 format. The DS1 interface 610 receives DS1s from the DS3 interface 608 or from an external connection. The DS0 interface 612 receives user communications in the DS0 format and provides an interface to the AAL 616. The ISDN/GR-303 interface 620 receives user communications in either the ISDN format or the GR-303 format and converts the user communications to the DS0 format. In addition, each interface may transmit user communications in like manner to the communication device 624.

The OC-M/STS-M interface 618 is operational to receive ATM cells from the AAL 616 and to transmit the ATM cells over the connection to the communication device 626. The OC-M/STS-M interface 618 also may receive ATM cells in the OC or STS format and transmit them to the AAL 616.

Call signaling may be received through and transferred from the OC-N/STS-N interface 606 and the ISDN/GR-303 interface 620. Also, call signaling may be received through and transferred from the OC-M/STS-M interface 618. The call signaling may be connected on a connection or transmitted to the control interface directly or via another interface as explained above.

The AAL 616 comprises both a convergence sublayer and a segmentation and reassembly (SAR) sublayer. The AAL 616 obtains the identity of the DS0 and the ATM VP/VC from the control interface 604. The AAL 616 is operational to convert between the DS0 format and the ATM format.

If desired, the AAL 616 can be configured to accept control messages through the control interface 604 for N×64 calls. The ATM interworking unit 602 is able to interwork, multiplex, and demultiplex for multiple DS0s.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 614 is included either separately (as shown) or as a part of the DS0 interface 612. The signaling processor 622 is configured to send control messages to the ATM interworking unit 602 to implement particular features on particular DS0 circuits. Alternatively, lookup tables may be used to implement particular features for particular circuits or VP/VCs.

FIG. 7 illustrates another exemplary embodiment of an interworking unit which is an ATM interworking unit 702 suitable for the present invention for use with an SDH system. The ATM interworking unit 702 preferably has a control interface 704, an STM-N electrical/optical (E/O) interface 706, an E3 interface 708, an E1 interface 710, an E0 interface 712, a signal processor 714, an AAL 716, an STM-M electrical/optical (E/O) interface 718, and a DPNSS interface 720. As used herein in conjunction with STM, "N" refers to an integer, and "M" refers to an integer.

The control interface 704 receives control messages from the signaling processor 722, identifies E0 and virtual connection assignments in the control messages, and provides these assignments to the AAL 716 for implementation. The control messages are received over an ATM virtual connection and through the STM-M interface 718 to the control interface 604 or directly through the control interface from a link.

The STM-N E/O interface 706, the E3 interface 708, the E1 interface 710, the E0 interface 712, and the DPNSS interface 720 each can receive user communications from a second communication device 724. Likewise, the STM-M E/O interface 718 can receive user communications from a third communication device 726.

The STM-N E/O interface 706 receives STM-N electrical or optical formatted user communications and converts the user communications from the STM-N electrical or STM-N optical format to the E3 format. The E3 interface 708 receives user communications in the E3 format and demultiplexes the user communications to the E1 format. The E3 interface 708 can receive E3s from the STM-N E/O interface 706 or from an external connection. The E1 interface 710 receives the user communications in the E1 format and demultiplexes the user communications to the E0 format. The E1 interface 710 receives E1s from the STM-N E/O interface 706 or the E3 interface 708 or from an external connection. The E0 interface 712 receives user communications in the E0 format and provides an interface to the AAL 716. The DPNSS interface 720 receives user communications in the DPNSS format and converts the user communications to the E0 format. In addition, each interface may transmit user communications in a like manner to the communication device 724.

The STM-M E/O interface 718 is operational to receive ATM cells from the AAL 716 and to transmit the ATM cells over the connection to the communication device 726. The STM-M E/O interface 718 may also receive ATM cells in the STM-M E/O format and transmit them to the AAL 716.

Call signaling may be received through and transferred from the STM-N E/O interface 706 and the DPNSS interface 720. Also, call signaling may be received through and transferred from the STM-M E/O interface 718. The call signaling may be connected on a connection or transmitted to the control interface directly or via another interface as explained above.

The AAL 716 comprises both a convergence sublayer and a segmentation and reassembly (SAR) sublayer. The AAL obtains the identity of the E0 and the ATM VP/VC from the control interface 704. The AAL 716 is operational to convert between the E0 format and the ATM format, either in response to a control instruction or without a control instruction. AAL's are known in the art. If desired, the AAL 716 can be configured to receive control messages through the control interface 704 for N×64 user communications.

E0 connections are bidirectional and ATM connections typically are unidirectional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 714 is included either separately (as shown) or as a part of the E0 interface 712. The signaling processor 722 is configured to send control messages to the ATM interworking unit 702 to implement particular features on particular circuits. Alternatively, lookup tables may be used to implement particular features for particular circuits or VP/VCs.

THE SIGNALING PROCESSOR

The signaling processor receives and processes telecommunications call signaling, control messages, and customer data to selec connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 8:
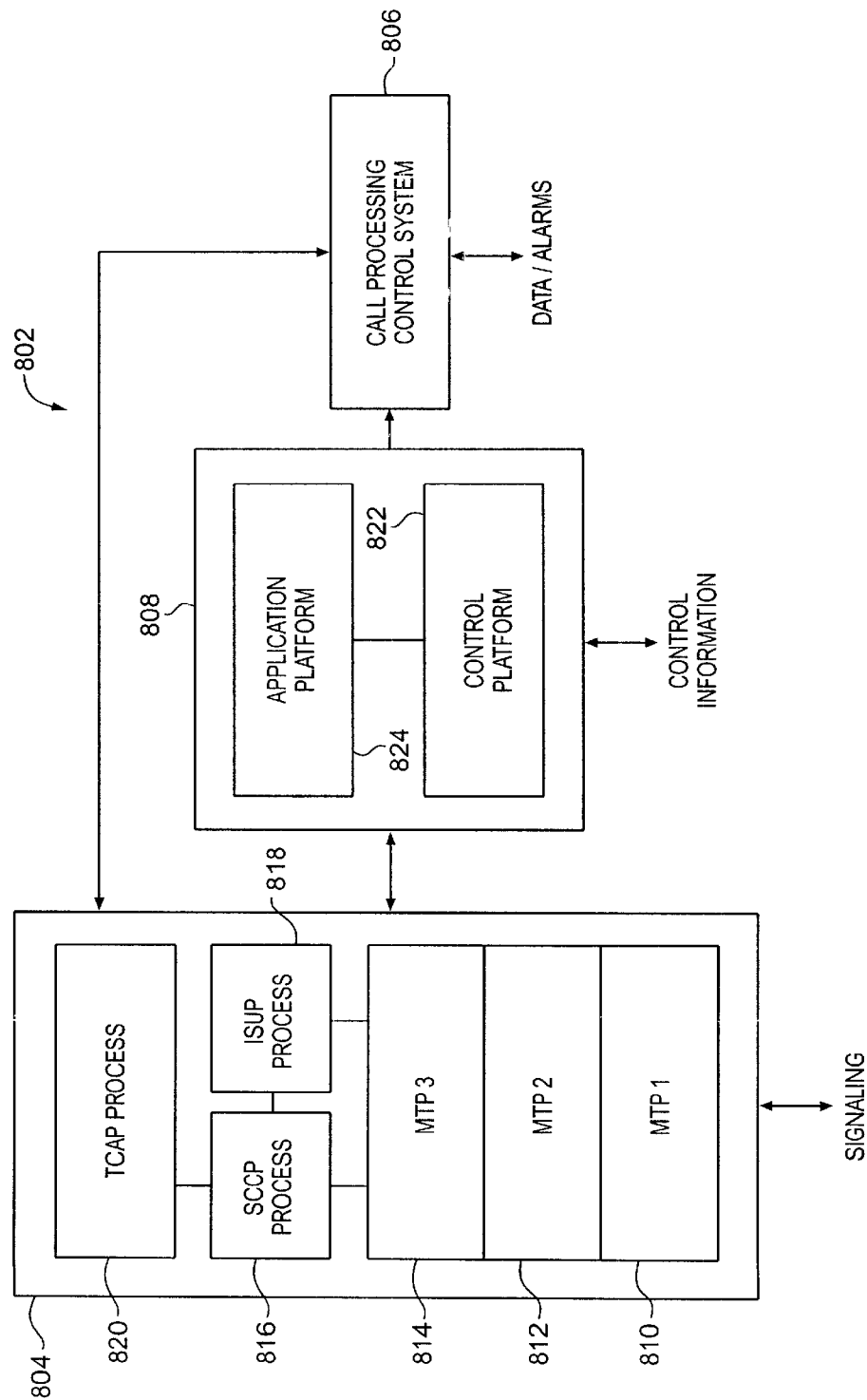
FIG. 8 is a block diagram of a signaling processor constructed in accordance with the present system.

FIG. 8 depicts an embodiment of a signaling processor. Other versions also are contemplated. In the embodiment of FIG. 8, the signaling processor 802 has a signaling interface 804, a call processing control system 806 (CPCS), and a call processor 808. It will be appreciated that the signaling processor 802 may be constructed as modules in a single unit or as multiple units.

The signaling interface 804 is coupled externally to signaling systems—preferably to signaling systems having a message transfer part (MTP), an ISDN user part (ISUP), a signaling connection control part (SCCP), an intelligent network application part (INAP), and a transaction capabilities application part (TCAP). The signaling interface 804 preferably is a platform that comprises an MTP level 1 810, an MTP level 2 812, an MTP level 3 814, an SCCP process 816, an ISUP process 818, and a TCAP process 820. The signaling interface 804 also has INAP functionality.

The signaling interface 804 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 804 is operational to transmit, process, and receive call signaling. The TCAP, SCCP, ISUP, and INAP functionality use the services of the MTP to transmit and receive the messages. Preferably, the signaling interface 804 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 804 process information that is received in message signal units (MSUs) and convert the information to call information elements that are sent to the call processor 808 to be processed. A call information element may be, for example, an ISUP IAM message parameter from the MSU. The signaling interface 804 strips the unneeded header information from the MSU to isolate the message information parameters and passes the parameters to the call processor 808 as the call information elements. Examples of these parameters are the called number, the calling number, and user service information. Other examples of messages with information elements are an ANM, an ACM, an REL, an RLC, and an INF. In addition, call information elements are transferred from the call processor 808 back to the signaling interface 804, and the information elements are reassembled into MSUs and transferred to a signaling point.

The CPCS 806 is a management and administration system. The CPCS 806 is the user interface and external systems interface into the call processor 808. The CPCS 806 serves as a collection point for call-associated data such as logs, operational measurement data, statistical information, accounting information, and other call data. The CPCS 806 can configure the call-associated data and/or transmit it to reporting centers.

The CPCS 806 accepts data, such as the translations, from a source such as an operations system and updates the data in the tables in the call processor 808. The CPCS 806 ensures that this data is in the correct format prior to transferring the data to the call processor 808. The CPCS 806 also provides configuration data to other devices including the call processor 808, the signaling interface 804, the interworking unit (not shown), and the controllable ATM matrix (not shown). In addition, the CPCS 806 provides for remote control of call monitoring and call tapping applications from the call processor 808.

The CPCS 806 also serves as a collection point for alarms. Alarm information is transferred to the CPCS 806. The CPCS 806 then transports alarm messages to the required communication device. For example, the CPCS 806 can transport alarms to an operations center.

The CPCS 806 also has a human-machine interface (HMI). This allows a person to log onto the CPCS 806 and manage data tables or review data tables in the CPCS or provide maintenance services.

The call processor 808 processes call signaling and controls an ATM interworking unit, such as an ATM interworking multiplexer (mux) that performs interworking of DS0s and VP/VCs, and an ATM matrix. However, the call processor 808 may control other communications devices and connections in other embodiments.

The call processor 808 comprises a control platform 822 and an application platform 824. Each platform 822 and 824 is coupled to the other platform.

The control platform 822 is comprised of various external interfaces including an interworking unit interface, a controllable ATM matrix, an echo interface, a resource control interface, a call information interface, and an operations interface. The control platform 822 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 806. Typical call information includes accounting information, such as the parties to the call, time points for the call, and any special features applied to the call. One skilled in the art will appreciate how to produce the software for the interfaces in the control platform 822.

The application platform 824 processes signaling information from the signaling interface 804 to select connections. The identity of the selected connections are provided to the control platform 822 for the interworking unit interface and/or for the controllable ATM matrix interface. The application platform 824 is responsible for validation, translation, routing, call control, exceptions, screening, and error handling. In addition to providing the control requirements for the interworking unit and the controllable ATM matrix, the application platform 824 also provides requirements for echo control and resource control to the appropriate interface of the control platform 822. In addition, the application platform 824 generates signaling information for transmission by the signaling interface 804. The signaling information might be for ISUP, INAP, or TCAP messages to external network elements. Pertinent information for each call is stored in an enhanced circuit data block (ECDB) for the call. The ECDB can be used for tracking and accounting the call.

The application platform 824 preferably operates in general accord with the Basic Call State Model (BCSM) defined by the ITU. An instance of the BCSM is created to handle each call. The BCSM includes an originating process and a terminating process. The application platform 824 includes a service switching function (SSF) that is used to invoke the service control function (SCF). Typically, the SCF is contained in an SCP. The SCF is queried with TCAP or INAP messages that are transported by the signaling interface 804 and which are initiated with information from the SSF in the application platform 824. The originating or terminating processes will access remote databases with intelligent network (IN) functionality via the SSF.

Software requirements for the application platform 824 can be produced in specification and description language (SDL) defined in ITU-T Z.100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 808 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 8, it can be seen that the application platform 824 processes signaling information to control numerous systems and facilitate call connections and services. The SS7 signaling is exchanged between the call processor 808 and external components through the signaling interface 804, and control information is exchanged with external systems through the control platform 822. Advantageously, the signaling interface 804, the CPCS 806, and the call processor 808 are not integrated into a switch central processing unit (CPU) that is coupled to a switching matrix. Unlike an SCP, the components of the signaling processor 802 are capable of processing ISUP messages independently of TCAP queries.

SS7 MESSAGE DESIGNATIONS

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address Message
LPA—Loop Back Acknowledgment
PAM—Pass Along Message
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

CALL PROCESSOR TABLES

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 9:
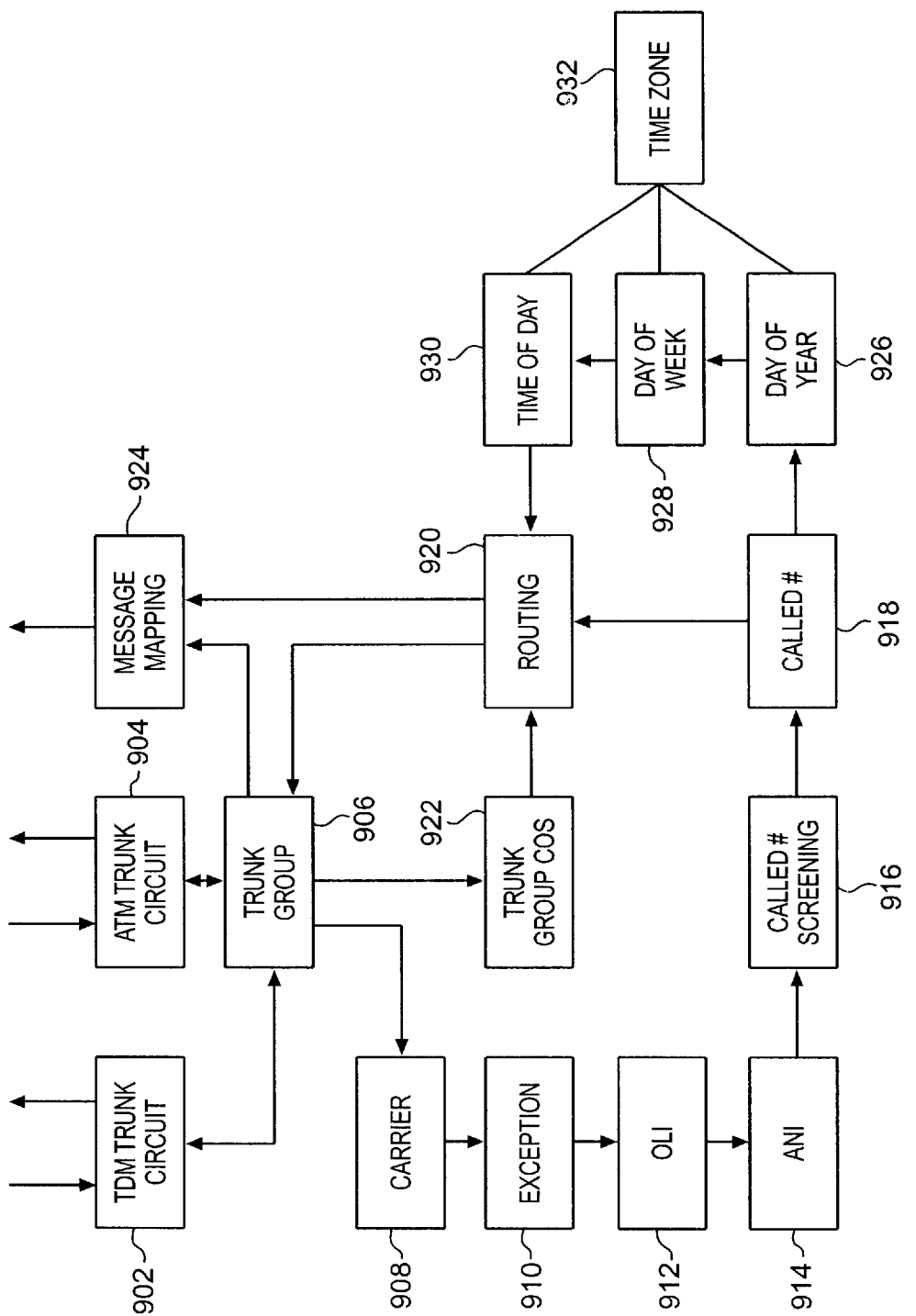
FIG. 9 is a block diagram of a data structure having tables that are used in the signaling processor of FIG. 8.

FIG. 9 depicts an exemplary data structure preferably used by the call processor 802 of FIG. 8 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 9.

The primary data structure has a TDM trunk circuit table 902, an ATM trunk circuit table 904, a trunk group table 906, a carrier table 908, an exception table 910, an originating line information (OLI) table 912, an automatic number identification (ANI) table 914, a called number screening table 916, a called number table 918, a routing table 920, a trunk group class of service (COS) table 922, and a message mapping table 924. Also included in the data structure are a day of year table 926, a day of week table 928, a time of day table 930, and a time zone table 932.

The TDM trunk circuit table 902 contains information required to provision the TDM side of a connection from the call processor site. Each circuit on the TDM side of a connection has an entry. The TDM trunk circuit table 902 is accessed from the trunk group table 906 or an external call process, and it points to the trunk group table.

The ATM trunk circuit table 904 contains information required to provision the ATM side of a connection. Typically, one record appears in this table per ATM trunk group. Although, the system can be configured alternately for multiple records per trunk group. The ATM trunk circuit table 904 is accessed from the trunk group table 906 or an external call process, and it points to the trunk group table.

The trunk group table 906 contains information that is required to build trunk groups out of different trunk members identified in the TDM and ATM trunk circuit tables 902 and 904. The trunk group table 906 contains information related to the originating and terminating trunk groups. The trunk group table 906 typically points to the carrier table 908. Although, the trunk group table 906 may point to the exception table 910, the OLI table 912, the ANI table 914, the called number screening table 916, the called number table 918, the routing table 920, the day of year table 926, the day of week table 928, the time of day table 930, and the treatment table (see FIG. 10).

For default processing of an IAM of an outgoing call in the forward direction, when the call process determines call setup and routing parameters for user communications on the originating portion, the trunk group table 906 is the next table after the TDM and ATM trunk circuit tables 902 and 904, and the trunk group table points to the carrier table 908. For default processing of an LAM of an outgoing call in the forward direction, when the call process determines call setup and routing parameters for user communications on the terminating portion, the trunk group table 906 is the next table after the routing table 920, and the trunk group table points to the TDM or ATM trunk circuit table 902 or 904. For default processing of an ACM or an ANM of an outgoing call in the originating direction, when the call process determines parameters for signaling, the trunk group table 906 is the next table after the TDM or ATM trunk circuit table 902 or 904, and the trunk group table points to the message mapping table 924. It will be appreciated that this is the default method, and, as explained herein, other implementations of table processing occur.

The carrier table 908 contains information that allows calls to be screened based, at least in part, on the carrier information parameter and the carrier selection parameter. The carrier table 908 typically points to the exception table 910. Although, the carrier table 908 may point to the OLI table 912, the ANI table 914, the called number screening table 916, the called number table 918, the routing table 920, the day of year table 926, the day of week table 928, the time of day table 930, the treatment table (see FIG. 10), and the database services table (see FIG. 11).

The exception table 910 is used to identify various exception conditions related to the call that may influence the routing or handling of the call. The exception table 910 contains information that allows calls to be screened based, at least in part, on the called party number and the calling party's category. The exception table 910 typically points to the OLI table 912. Although, the exception table 910 can point to the ANI table 914, the called number screening table 916, the called number table 918, the routing table 920, the day of year table 926, the day of week table 928, the time of day table 930, the call rate table, the percent control table, the treatment table (see FIG. 10), and the database services table (see FIG. 11).

The OLI table 912 contains information that allows calls to be screened based, at least in part, on originating line information in an IAM. The OLI table 912 typically points to the ANI table 914. Although, the OLI table can point to the called number screening table 916, the called number table 918, the routing table 920, the day of year table 926, the day of week table 928, the time of day table 930, and the treatment table (see FIG. 10).

The ANI table 914 is used to identify any special characteristics related to the caller's number, which is commonly known as automatic number identification. The ANI table 914 is used to screen and validate an incoming ANI. ANI specific requirements such as queuing, echo cancellation, time zone, and treatments can be established. The ANI table 914 typically points to the called number screening table 916. Although, the ANI table 914 can point to the called number table 918, the routing table 920, the day of year table 926, the day of week table 928, the time of day table 930, and the treatment table (see FIG. 10).

The called number screening table 916 is used to screen called numbers. The called number screening table 916 determines the disposition of the called number and the nature of the called number. The called number screening table 916 is used to provide the trigger detection point (TDP) for an AIN SCP TCAP query. It is used, for example, with the local number portability (LNP) feature. The called number screening table can invoke a TCAP. The called number screening table 916 typically points to the called number table 918. Although, the called number screening table 916 can point to the routing table 920, the treatment table, the call rate table, the percent table (see FIG. 10), and the database services table (see FIG. 11).

The called number table 918 is used to identify routing requirements based on, for example, the called number. This will be the case for standard calls. The called number table 918 typically points to the routing table 910. In addition, the called number table 926 can be configured to alternately point to the day of year table 926. The called number table 918 can also point to the treatment table (see FIG. 10) and the database services table (see FIG. 11).

The routing table 920 contains information relating to the routing of a call for various connections. The routing table 920 typically points to the treatment table (see FIG. 10). Although, the routing table also can point to the trunk group table 906 and the database services table (see FIG. 11).

For default processing of an IAM of an outgoing call in the forward direction, when the call process determines call setup and routing parameters for user communications, the routing table 920 is the next table after the called number table 918, and the routing table points to the trunk group table 906. For default processing of an IAM of an outgoing call in the forward direction, when the call process determines parameters for signaling, the routing table 920 is the next table after the called number table 918, and the routing table points to the message mapping table 924. It will be appreciated that this is the default method, and, as explained herein, other implementations of table processing occur.

The trunk group COS table 922 contains information that allows calls to be routed differently based on the class of service assigned to the originating trunk group and to the terminating trunk group. The trunk group COS table can point to the routing table 920 or the treatment table (see FIG. 10).

When the trunk group COS table 922 is used in processing, after the routing table 920 and the trunk group table 906 are processed, the trunk group table points to the trunk group COS table. The trunk group COS table points back to the routing table 920 for further processing. Processing then continues with the routing table 920 which points to the trunk group table 906, and the trunk group table which points to the TDM or ATM trunk circuit table 902 or 904. It will be appreciated that this is the default method, and, as explained herein, other implementations of table processing occur.

The message mapping table 924 is used to provide instructions for the formatting of signaling messages from the call processor. It typically can be accessed by the routing table 920 or the trunk group table 906 and typically determines the format of the outgoing messages leaving the call processor.

The day of year table 926 contains information that allows calls to be routed differently based on the day of the year. The day of year table typically points to the routing table 920 and references the time zone table 932 for information. The day of year table 926 also can point to the called number screening table 916, the called number table 918, the routing table 920, the day of week table 928, the time of day table 930, and the treatment table (see FIG. 10).

The day of week table 928 contains information that allows calls to be routed differently based on the day of the week. The day of week table typically points to the routing table 920 and references the time zone table 932 for information. The day of week table 928 also can point to the called number screening table 916, the called number table 918, the time of day table 930, and the treatment table (see FIG. 10).

The time of day table 930 contains information that allows calls to be routed differently based on the time of the day. The time of day table 930 typically points to the routing table 920 and references the time zone table 932 for information. The time of day table 930 also can point to the called number screening table 916, the called number table 918, and the treatment table (see FIG. 10).

The time zone table 932 contains information that allows call processing to determine if the time associated with the call processing should be offset based on the time zone or daylight savings time. The time zone table 932 is referenced by, and provides information to, the day of year table 926, the day of week table 928, and the time of day table 930.

Figure 10:
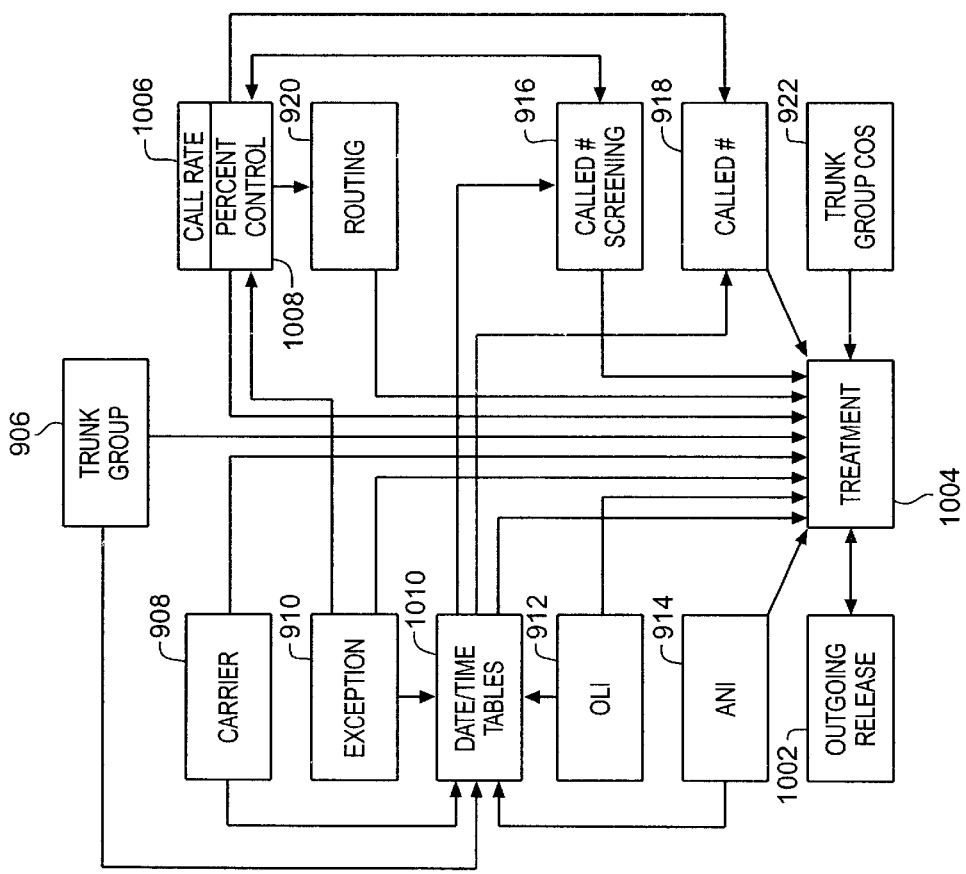
FIG. 10 is a block diagram of additional tables that are used in the signaling processor of FIG. 8.

FIG. 10 is an overlay of FIG. 9. The tables from FIG. 9 are present. However, for clarity, the table's pointers have been omitted, and some tables have not been duplicated in FIG. 10. FIG. 10 illustrates additional tables that can be accessed from the tables of FIG. 9. These include an outgoing release table 1002, a treatment table 1004, a call rate table 1006, and a percent control table 1008, and time/date tables 1010.

The outgoing release table 1002 contains information that allows call processing to determine how an outgoing release message is to be formatted. The outgoing release table 1002 typically points to the treatment table 1006.

The treatment table 1004 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 1004 typically points to the outgoing release table 1002 and the database services table (see FIG. 11).

The call rate table 1006 contains information that is used to control call attempts on an attempt per second basis. Preferably, attempts from 100 per second to 1 per minute are programmable. The call rate table 1006 typically points to the called number screening table 916, the called number table 918, the routing table 920, and the treatment table 1004.

The percent control table 1008 contains information that is used to control call attempts based upon a percent value of the traffic that is processed through call processing. The percent control table 1008 typically points to the called number screening table 916, the called number table 918, the routing table 920, and the treatment table 1004.

The date/time tables 1010 have been identified in FIG. 9 as the day of year table 926, the day of week table 928, the time of day table 926, and the time zone table 932. They are illustrated in FIG. 10 as a single location for ease and clarity but need not be so located.

Figure 11:
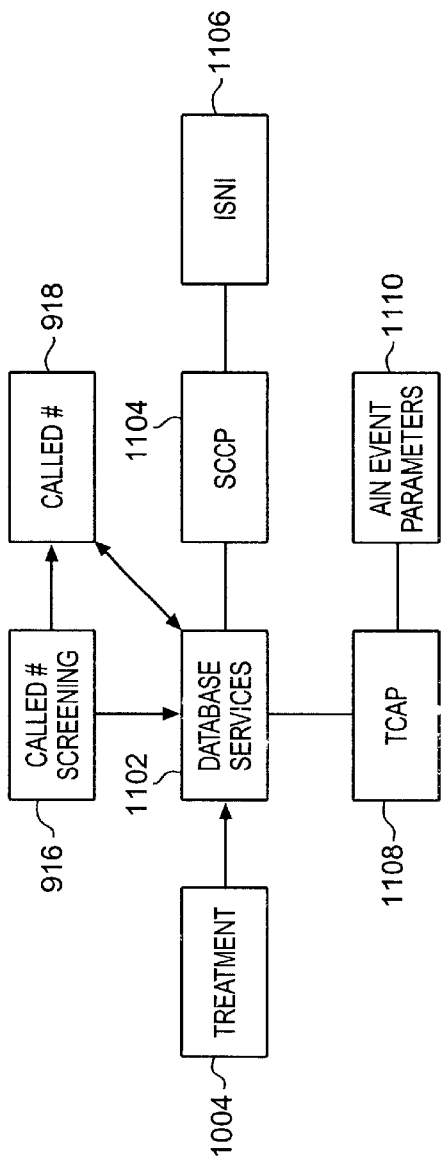
FIG. 11 is a block diagram of additional tables that are used in the signaling processor of FIG. 8.

FIG. 11 is an overlay of FIGS. 9–10. The tables from FIGS. 9–10 are present. However, for clarity, the table's pointers have been omitted, and some tables have not been duplicated in FIG. 11.

FIG. 11 illustrates additional tables that can be accessed from the tables of FIGS. 9–10 and which are directed to the TCAP and the SCCP message processes. These include a database services table 1102, a signaling connection control part (SCCP) table 1104, an intermediate signaling network identification (ISNI) table 1106, a transaction capabilities application part (TCAP) table 1108, and an advanced intelligent network (AIN) event parameters table 1110.

The database services table 1102 contains information about the type of database service requested by call processing. The database services table 1102 references and obtains information from the SCCP table 1104 and the TCAP table 1108. After the database function is performed, the call is returned to normal call processing. The database services table 1102 points to the called number table 918.

The SCCP table 1104 contains information and parameters required to build an SCCP message. The SCCP table 1104 is referenced by the database services table 1102 and provides information to the database services table.

The ISNI table 1106 contains network information that is used for routing SCCP message to a destination node. The ISNI table 1106 is referenced by the SCCP table 1104 and provides information to the SCCP table.

The TCAP table 1108 contains information and parameters required to build a TCAP message. The TCAP table 1108 is referenced by the database services table 1102 and provides information to the database services table.

The AIN event parameters table 1110 contains information and parameters that are included in the parameters portion of a TCAP event message. The AIN event parameters table 1110 is referenced by the TCAP table 1108 and provides information to the TCAP table.

Figure 12:
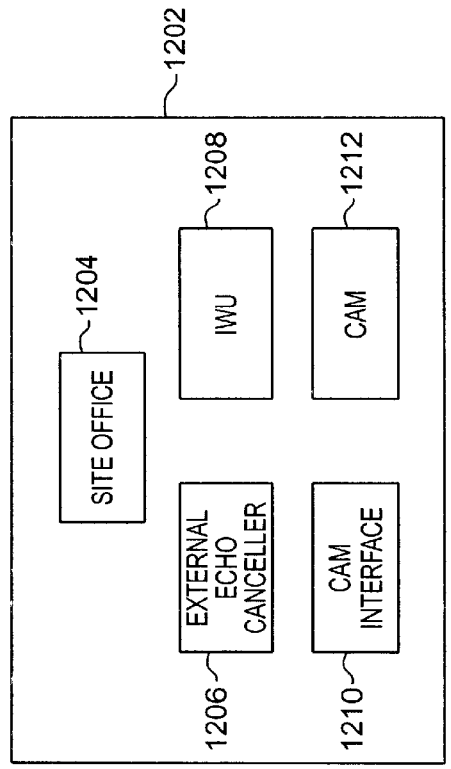
FIG. 12 is a block diagram of additional tables that are used in the signaling processor of FIG. 8.

FIG. 12 is an overlay of FIGS. 9–11. The tables from FIGS. 9–11 are present. However, for clarity, the tables have not been duplicated in FIG. 12. FIG. 12 illustrates additional tables that can be used to setup the call process so that the tables of FIGS. 9–11 may be used. These setup tables 1202 include a site office table 1204, an external echo canceller table 1206, an interworking unit (IWU) table 1208, a controllable ATM matrix (CAM) interface table 1210, and a controllable ATM matrix (CAM) table 1212.

The site office table 1204 contains information which lists office-wide parameters, some of which are information-based and others which affect call processing. The site office table 1204 provides information to the call processor or switch during initialization or other setup procedures, such as population of data or transfer of information to one or more memory locations for use during call processing.

The external echo canceller 1206 contains information that provides the interface identifier and the echo canceller type when an external echo canceller is required. The external echo canceller table 1206 provides information to the call processor or switch during initialization or other setup procedures, such as population of data or transfer of information to one or more memory locations for use during call processing.

The IWU table 1208 contains the internet protocol (IP) identification numbers for interfaces to the interworking units at the call processor or switch site. The IWU table 1208 provides information to the call processor or switch during initialization or other setup procedures, such as population of data or transfer of information to one or more memory locations for use during call processing.

The CAM interface table 1210 contains information for the logical interfaces associated with the CAM. The CAM interface table 1210 provides information to the call processor or switch during initialization or other setup procedures, such as population of data or transfer of information to one or more memory locations for use during call processing.

The CAM table 1212 contains information associated with the logical and physical setup properties of the CAM. The CAM table 1212 provides information to the call processor or switch during initialization or other setup procedures, such as population of data or transfer of information to one or more memory locations for use during call processing.

FIGS. 13–42 depict examples of the various tables described above. It will be appreciated that other versions of tables may be used. In addition, information from the identified tables may be combined or changed to form different tables.

FIG. 13 depicts an example of a TDM trunk circuit table. The TDM trunk circuit table is used to access information about the originating circuit for originating circuit call processing. It also is used to provide information about the terminating circuit for terminating circuit call processing.

The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 14 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 15A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is not received in an IAM, the default JIP is a value recorded on the call processor ECDB. If an incoming IAM does not have a JIP, call processing will populate the JIP of the outgoing IAM with the default value from the trunk group table. If a JIP is not data filled, an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 15B is a continuation of FIG. 15A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be reattempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 15C is a continuation of FIG. 15B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 16 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 17 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" is a decimal number ranging from 1–15 digits. It can be any length and, if filled with less than 15 digits, is filled with 9s for the remaining digits. The next function and next label entries point to the next table and the next entry within that table for the next routing function.

FIG. 18 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 19 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 906.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 20 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 21 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 22 depicts an example of a day of year table. The day of year label is used as a key to enter the table. The date field indicates the local date which is applicable to the action to be taken during the processing of this table. The next function and next label identify the table and the area within that table for further call processing.

FIG. 23 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 24 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 25 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America. The daylight savings entry indicates whether daylight savings time is used during the summer in this time zone.

FIG. 26 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 27 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 28 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 29 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 30 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 31 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 32 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 33A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 33B is a continuation of FIG. 33A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message. The label subfield identifies a unique address into the ISNI table when the route indicator sub-field is set to "constrained" and the mark identification subfield is set to "yes."

FIG. 33C is a continuation of FIG. 33B for the SCCP table. FIG. 33C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 33D is a continuation of FIG. 33C for the SCCP table. FIG. 33D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 34 depicts an example of an intermediate signaling network identification (ISNI) table. The ISNI table contains a list of networks that will be used for routing SCCP messages to the destination node. The ISNI label is used as a key to enter the table. The network fields 1–16 identify the network number of up to 16 networks that may be used for routing the SCCP message.

FIG. 35 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 36 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 37 depicts an example of an interworking unit interface table. The interworking unit (IWU) is a key that is used to enter the table. The IWU identification (ID) identifies which interworking unit is being addressed. The internet protocol (IP) sockets 1–4 specify the IP socket address of any of the four connections to the interworking unit.

FIG. 38 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 39 depicts an example of a controllable ATM matrix (CAM) table. The CAM label is used as a key to enter the table. The CAM type indicates the type of CAM control protocol. The CAM address identifies the address of the CAM.

FIG. 40A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 40B is a continuation of FIG. 40A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 40C is a continuation of FIG. 40B for the call processor or switch site office table. The maximum trunks for the off hook queuing (max trunks OHQ) specifies a maximum number of trunk groups that can have the off hook queuing enabled. The OHQ timer one (TQ1) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 40D is a continuation of FIG. 40C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 41A–41B depict an example of an advanced intelligent network (AIN) event parameters table. The AIN event parameters table has two columns. The first identifies the parameters that will be included in the parameters portion of the TCAP event message. The second entry may include information for analysis.

FIG. 42 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A system for connecting a call having user communications and call signaling, the system comprising:

a signaling processor configured to receive the call signaling, process the call signaling to select a first connection and a second connection, and transmit a first control message designating the first connection, a second control message designating the second connection, and a third control message;

a controllable time division multiplex matrix configured to receive the user communications, receive the first control message, and connect the user communications to the first connection based on the first control message;

a digital signal processor configured receive the user communications over the first connection, receive the second control message, process the user communications based on the second control message, and transmit the user communication over the second connection based on the second control message; and an interworking unit configured to receive the user communications, receive the third control message, interwork the user communications from a time division multiplexing format to a non-time division multiplexing format based on the third control message, and transmit the user communications in the non-time division multiplexing format.

2. The system of claim 1 wherein the non-time division multiplexing format is asynchronous transfer mode.

3. The system of claim 2 wherein the signaling processor is configured to select a third connection and transmit a third control message designating the third connection and the system further comprises an asynchronous transfer mode matrix configured to receive the user communications in the non-time division multiplexing format, receive the third control message, and transmit the user communication over the third connection based on the third control message.

4. The system of claim 1 wherein the call signaling comprises an initial address message.

5. The system of claim 1 wherein the digital signal processor is configured to provide echo control to the user communications.

6. The system of claim 1 wherein the digital signal processor is configured to provide compression to the user communications.

7. The system of claim 1 wherein the digital signal processor is configured to provide encryption to the user communications.

8. The system of claim 1 wherein the signaling processor is external to the controllable time division multiplex matrix, the digital signal processor, and the interworking unit.

9. The system of claim 1 wherein the digital signal processor resides within the controllable time division multiplex matrix.

10. The system of claim 1 wherein the digital signal processor resides within the interworking unit.

11. A method for connecting a call having user communications and call signaling, the method comprising:

in a signaling processor, receiving and processing the call signaling to select a first connection and a second connection;

transmitting a first control message designating the first connection, a second control message designating the second connection, and a third control message from the signaling processor;

receiving the user communications and the first control message into a controllable time division multiplex matrix;

in the controllable time division multiplex matrix, connecting the user communications to the first connection based on the first control message;

in a digital signal processor, receiving the user communications over the first connection and receiving the second control message;

in the digital signal processor, processing the user communications based on the second control message;

transmitting the user communication over the second connection from the digital signal processor based on the second control message in an interworking unit, receiving the user communications and the third control message;

in the interworking unit, interworking the user communications from a time division multiplexing format to a non-time division multiplexing format based on the third control message; and transmitting the user communications in the non-time division multiplexing format from the interworking unit.

12. The method of claim 11 wherein the non-time division multiplexing format is asynchronous transfer mode.

13. The method of claim 12 further comprising:

in the signaling processor, selecting a third connection;

transmitting a third control message designating the third connection from the signaling processor;

in an asynchronous transfer mode matrix, receiving the user communications in the non-time division multiplexing format and receiving the third control message; and transmitting the user communication over the third connection from the asynchronous transfer mode matrix based on the third control message.

14. The method of claim 11 wherein the call signaling comprises an initial address message.

15. The method of claim 11 further comprising in the digital signal processor, providing echo control to the user communications.

16. The method of claim 11 further comprising in the digital signal processor, providing compression to the user communications.

17. The method of claim 11 further comprising in the digital signal processor, providing encryption to the user communications.

18. The method of claim 11 wherein the signaling processor is external to the controllable time division multiplex matrix, the digital signal processor, and the interworking unit.

19. The method of claim 11 wherein the digital signal processor resides within the controllable time division multiplex matrix.

20. The method of claim 11 wherein the digital signal processor resides within the interworking unit.

* * * * *